United States Patent

Zelikovitz et al.

[11] Patent Number: 5,761,312
[45] Date of Patent: Jun. 2, 1998

[54] ENHANCED INDIVIDUAL INTELLIGENT COMMUNICATION PLATFORM FOR SUBSCRIBERS ON A TELEPHONE SYSTEM

[76] Inventors: Joseph Zelikovitz, deceased, late of Grove, Okla.; Bernard Greenblott, legal representative, 373 Wildwood La., Deerfield Beach, Fla. 33442; Jerry L. Owen, legal representative, 3933 Hartline, Del City, Okla. 73115

[21] Appl. No.: 476,343

[22] Filed: Jun. 7, 1995

[51] Int. Cl.$^6$ .................................................. H04L 9/00
[52] U.S. Cl. ................................... 380/49; 380/2; 380/4; 380/10; 380/59; 379/90.01
[58] Field of Search ........................ 380/9, 10, 49, 380/50, 59, 2, 4; 379/67, 88, 90, 93, 110, 112, 114, 90.01, 93.01–93.09, 93.11–93.19, 93.21–93.29, 93.31–93.37, 110.01

[56] References Cited

U.S. PATENT DOCUMENTS

| | | |
|---|---|---|
| 3,786,424 | 1/1974 | McVoy et al. . |
| 3,803,491 | 4/1974 | Osborn . |
| 3,987,398 | 10/1976 | Fung . |
| 3,990,012 | 11/1976 | Karnes . |
| 4,027,153 | 5/1977 | Käch . |
| 4,062,043 | 12/1977 | Zeidler et al. . |
| 4,064,460 | 12/1977 | Gargini . |
| 4,089,584 | 5/1978 | Polczynski . |
| 4,090,067 | 5/1978 | Bell, III et al. . |
| 4,090,221 | 5/1978 | Connor . |
| 4,290,142 | 9/1981 | Schnee et al. . |
| 4,322,854 | 3/1982 | Bundens et al. . |
| 4,343,042 | 8/1982 | Schrock et al. . |
| 4,395,780 | 7/1983 | Gohm et al. . |
| 4,441,186 | 4/1984 | Erickson ................................. 372/19 |
| 4,450,481 | 5/1984 | Dickinson . |
| 4,491,983 | 1/1985 | Pinnow et al. . |
| 4,686,667 | 8/1987 | Ohnsorge . |
| 4,760,442 | 7/1988 | O'Connell et al. . |
| 5,136,411 | 8/1992 | Paik et al. ............................. 359/125 |
| 5,193,110 | 3/1993 | Jones et al. ........................... 379/88 X |
| 5,325,223 | 6/1994 | Bears .................................... 359/137 |
| 5,384,829 | 1/1995 | Heileman, Jr. et al. ............... 379/67 |
| 5,483,582 | 1/1996 | Pugh et al. ........................... 379/112 X |

*Primary Examiner*—Bernarr E. Gregory
*Attorney, Agent, or Firm*—Sidley & Austin

[57] ABSTRACT

A multiple function individual intelligent communication platform is disclosed which supports the subscriber at the subscriber's location. Tremendous functionality is incorporated into a single system capable of interfacing with standard telephone equipment, as well as personal computers, infrared remote control sensors, televisions, VCRs, microphones, speakers, and other I/O devices.

20 Claims, 18 Drawing Sheets

5,761,312

ENHANCED INDIVIDUAL INTELLIGENT COMMUNICATION PLATFORM FOR SUBSCRIBERS ON A TELEPHONE SYSTEM

TECHNICAL FIELD OF THE INVENTION

An improved and enhanced individual intelligent communication platform for subscribers on a telephone system.

BACKGROUND OF THE INVENTION

Standard handsets in telephone systems have changed little since Bell's initial development of the telephone. The basic idea has changed little over the years except for some significant developments. For instance, rotary dial mechanical signaling of a telephone call was a substantial improvement over operator-based system. This rotary dial improvement eliminated the overhead of hiring enormous numbers of operators previously necessary to manually connect telephone calls. The touch-tone pad was a substantial improvement over the rotary-dial signaling system. This touch-tone improvement allowed the reduction in time needed to place a telephone call thereby reducing the overhead of the telephone company.

Presently, vertical services are available on the telephone network such as call-waiting, three-way calling, call forwarding, speed dialing and others. These vertical services, however, are limited by the use of the same basic telephone system handset invented by Bell. This handset, apart from the substantial improvements such as rotary dialing or touch-tone dialing, has remained fairly constant in its implementation over the years. The handset has yet to progress and fully utilize the state of the art technology currently available in the market. The present invention introduces an individual intelligent communication platform which incorporates the tremendous functionality with today's technology into a complete and comprehensive, as well as unitary, system.

SUMMARY OF THE INVENTION

This invention comprises an individual intelligent communication platform appropriately programmed with numerous functions to provide the subscriber with a versatile and comprehensive system capable of using the state of the art technology in a single comprehensive system. The invention utilizes a memory area for storage of pertinent data and database information, as well as a real-time processor which is capable of answering and responding to telephone calls over one or more wire pairs and one or more radio loops. A security system is also incorporated into the invention to preclude unauthorized access to the individual intelligent communication platform, monitor for unauthorized access to an ongoing call and encrypt and decrypt communications for security purposes.

By improving the performance of the station set with the invention, an individual intelligent communication platform, the telephone system can eliminate busy signals, unintentional call blocking and achieve 100% call completion and message answering. The intelligent communication platform will also support all types of communication such as voice, image (fax), data, interactive graphics, video, interactive video, and random access video. Other features are supportable by the system such as command and control of household facilities and remote equipment coupled to the IICP.

Essentially, the invention will enhance a subscriber's phone service by enhancing the capabilities of the subscriber's telephone equipment at the subscriber's location. These enhancements will be at the subscriber's location instead of offering services at a centralized telephone company. This allows for personal control of the subscriber's communication environment and decentralizes specialized features away from the central telephone company's control.

DETAILED DESCRIPTION

Figure 1:
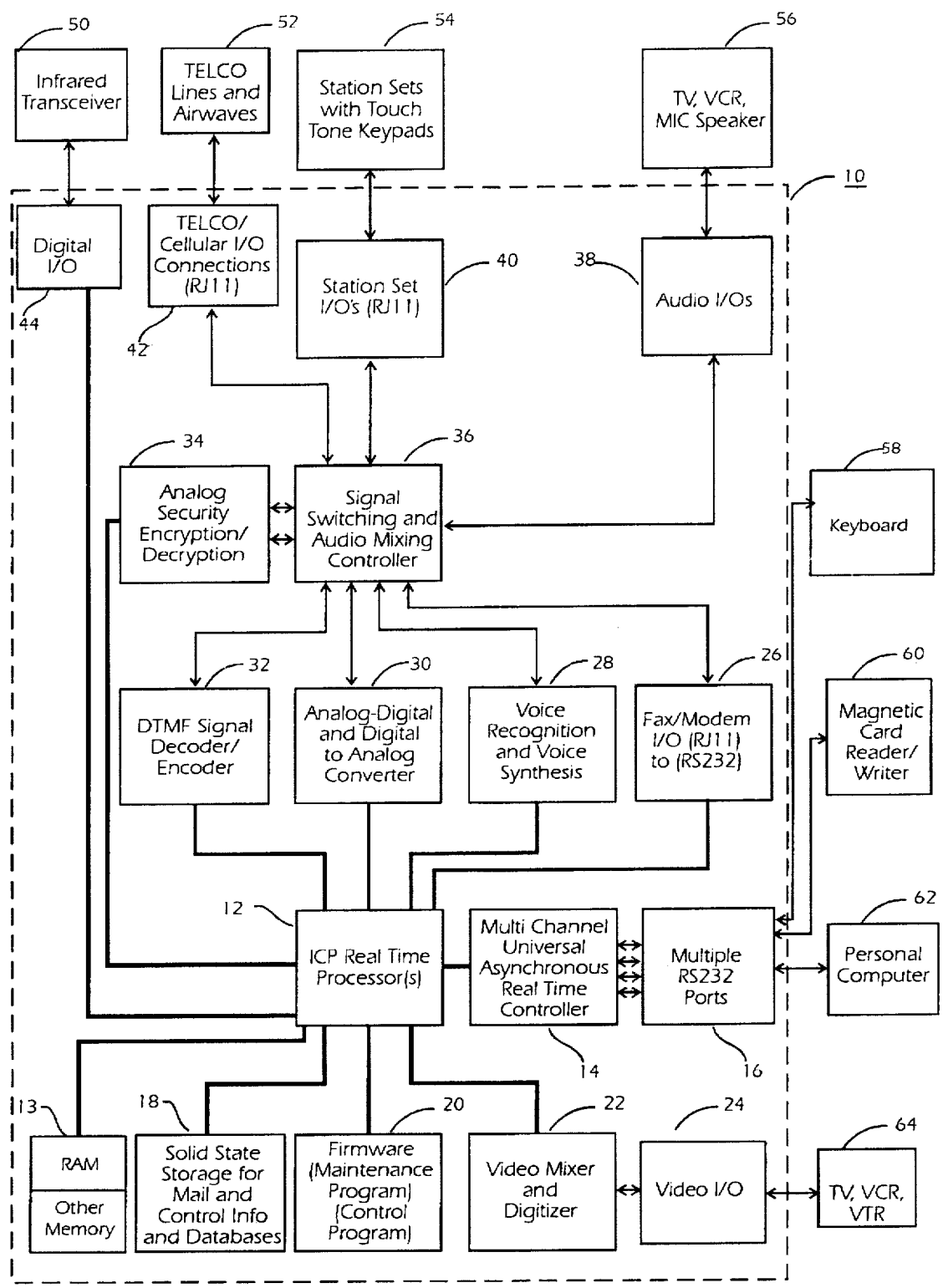
FIG. 1 is a block diagram of the Individual Intelligent Communication Platform (IICP) and the peripheral equipment coupled thereto.

The invention is called an individual intelligent communication platform (IICP, and sometimes just ICP). The IICP will operate at real-time and possess sufficient memory for programming and database support. The database will include all types of information including information that will assist the IICP in completing calls, as well as a recording of all numbers called by the subscriber. Separate billing information will be maintained at the IICP database to compare against billing and charges sent from telephone companies.

The IICP will interface with one wire pair and a virtual pair of wire loops. A virtual wire pair is a wire pair accessed using network functions such as call-waiting and three-way calling. The size of the IICP and interconnections may vary depending on the load of the subscriber. If the subscriber is a home user, one wire pair line plus call-waiting and three-way calling features may be sufficient to support the IICP, as well as a cellular telephone connection. If the subscriber is a small business, two wire pairs together with virtual lines supported by call-waiting and three-way call features may be sufficient. The small business may also be connected to different long distance services to support different telephone lines. A larger subscriber may possess three wire pair lines and three virtual lines supported by call-waiting and three-way call features, plus a cellular installation.

The IICP would also be connected at the subscriber location to a personal computer, a fax machine, video cassette recorder, a television, and/or a printer. Other peripheral devices may also be connected and controlled by the IICP.

Voice functions supported by the IICP would include incoming and outgoing call transmissions.

These voice functions for incoming call transmissions are as follows:

Discrete Ring Functions—a ring from the IICP indicates the call is intended for the subscriber at his or her location.

Intelligent Answer Functions—when no answer is received at the called IICP, the IICP will automatically take a message from the caller.

Locate Functions—if the called IICP does not receive an answer, the IICP will place the caller on hold and broadcast an inquiry to other related lines such as cellular connections or other likely locations for the intended caller.

Call Forwarding Functions—the subscriber can call his or her IICP and notify it of the remote location where the subscriber is currently located. The IICP will then forward the incoming calls to that location.

Call Back Functions—if the called IICP is unable to connect the caller with the subscriber, the IICP will continue to periodically broadcast to likely locations of the subscriber until the subscriber answers the IICP and notifies the IICP of his location or his desire not to answer any call transmissions.

Virtual Line Service Functions—incorporation of telephone network services into the services of the IICP will expand the number of wire lines available to the subscriber. These telephone network services may include three-way calling and call-waiting features.

Radio Loop Functions—cellular facilities would be built into the IICP so that a cellular line would be accessed in overload situations or in a security situation.

Security Functions—for incoming calls, a caller ID number could be asked for by the IICP in order to identify the caller as the subscriber or a select number of callers designated by the subscriber for priority purposes. If the subscriber's security number is received by the IICP, remote locations may be changed and messages may be accessed at remote locations by the subscriber from the IICP.

Screening Call Functions—only priority calls would be forwarded to remote locations by the IICP. A priority call is determined by the IICP through the use of a database or security code. If the incoming call is not forwarded to the subscriber at a remote location because it does not meet the priority threshold, incoming caller to the IICP would be able to leave a message so that the subscriber could decide later whether to call the party back.

Outgoing voice functions include the following:

Multiple Call Capacity—the IICP will support simultaneous, multiple communications with other IICPs or conventional station sets.

Call Security—before placing a call, the IICP would require a valid ID number or security code thereby preventing unauthorized use of the IICP at the subscriber location.

Call Screening—certain numbers could be prevented from calling or blocked intentionally by the IICP. Special security features would also be available as well as data encryption.

Repeat and Broadcast Functions—if a called party does not answer, the IICP can be configured to continue to attempt to call that party periodically or attempt to locate the calling party at other possible numbers as stored in the database. If a connection is made, the subscriber/calling party would be notified by the IICP that the connection had been made.

Call Number Check Functions—after inputting a number into the IICP, the IICP would check that input number against the database of stored numbers to make sure the input is correct. The database may be updated with new numbers added as required.

Non-Interference Functions—during an ongoing call, the attempted access to a line by a second, unauthorized user could be detected by the IICP. The IICP would notify the authorized users of the attempted breach of the on-going call and the unauthorized user would be denied access by the IICP unless subsequently authorized access by an authorized user.

Other voice functions include voice recognition and emergency services, and command/control of household facilities. The voice recognition and emergency services would be supported by the IICP through the use of microphones and voice recognition systems which would identify certain phrases and initiate calls to emergency services. For instance, the phrase "HELP" would initiate a call through 911 to the police, fire department and/or ambulance. The phrases "I'm sick" or "I'm hurt" would initiate a 911 call for an ambulance. The phrase "FIRE" would initiate a 911 call to the fire department. Or, the phrase "ROBBER" would initiate a 911 call to the police.

Command/control of household facilities may be supported by the IICP. At remote locations, a subscriber may call his IICP, input a security number and direct it to control certain household facilities such as alarms, heating and cooling systems, hot water tanks, indoor/outdoor lighting, garage doors, front door/back door locks, and lawn sprinkler schedules. Further, the subscriber may initiate notification services to others through the IICP such as the transmission of special messages to the mailman, lawn man, or milk man. Such messages may include notification of vacation, unexpected absences, or other events. These messages may be delivered through the re-transmission of voice mail messages through the IICP to various individuals.

Non-voice functions are also supported by the IICP such as fax transmission, data transmission, voice transcription, language translation, interactive graphics, video and random access video. The fax transmission functions would be supported by the IICP and include the following features:

Broadcast fax—fax automatically sent to multiple recipients.

Regular fax—fax sent to a specific recipient.

Voice annotated fax—audible comments are appended to a fax transmission.

Locate feature—if a subscriber is not presently available, an incoming fax is stored in the memory of the IICP and the IICP will attempt to locate the called subscriber to notify them of the received fax.

Dictate feature—a calling subscriber may dictate a message which is placed in written form (e.g. ASCII format) and faxed to a called party.

Data transmissions are also supported by a connection between the IICP and a personal computer. Through this connection, all electronic mail sent to the PC coupled to the IICP can be transferred to the IICP for printing on the attached printer or fax machine. Further, the e-mail may simply be output onto a CRT screen or TV screen which is also connected to the IICP. The e-mail message may also be read out audibly on the speaker attached to the IICP so the subscriber could access the e-mail at a remote location. The locate function is also available to notify the called subscriber that an e-mail message is waiting for him. Other data, reports or files would be accessible to the owner or subscriber locally or remotely through the IICP. This information may be communicated digitally or audibly through a voice synthesizer and access through modem or voice command.

Voice transcription would also be supported by the IICP such that a conversation over the transmission lines may be automatically transcribed into an ASCII readable document and stored in the memory of the IICP. Further, translation functions would also be supported by the IICP through the use of translation modules. These translation modules would take voice dialogue and convert it into other languages. Both voice transcription and translation features would be functions supported by the IICP alone or through the connections to the personal computer.

Interactive graphics would also be supported by connections to the IICP and a number of local loops to receive and transmit graphical information. These features would allow for a voice and graphics transmission to be accomplished simultaneously.

Media transmission and control would also be supported by the IICP through its coupling to a VCR or cable connection. The IICP could be remotely instructed to direct the VCR to record certain programs or to transmit video information to the IICP through the VCR or cable coupling to the calling party. The IICP could also be directed to accept delivery of a cable program from a local cable company and redirect the program over the phone lines to the subscriber at a remote locate. Random access video would be supported by accessing a video program from a selection menu.

Separate billing information would also be maintained by the IICP in a separate database. The IICP can indicate costs and time of calls following a call or over a time period. Further, the IICP can set up a budget and keep track of toll charges for each specific call and if any calls or the total of calls exceed this specific budget. Time and costs could also be announced during a telephone call to remind the caller of how long the phone call is progressing. Further, the IICP could maintain a database of specific numbers for billing purposes where these specific numbers designate specific clients, attorneys, consultants and the like so that billing could be accomplished almost automatically to the billing party.

The IICP could also produce a list of calls over a period of time for comparison to billings from a telephone company. The IICP could produce a list of numbers called, time, cost rate per minute and overall cost for a period of time. This report could be printed by the attached fax machine or an attached printer. This list could be sorted by called number, chronologically, or by cost. These printed logs could be used to assist in billing of calls at a business or to compare against phone company logs or bills.

The IICP will initiate a greeting and interactive response when the attached station set is taken off-the-hook. The interactive greeting would request the subscriber to tell them if they would like to receive their messages at the present time, if any messages have been stored. Further, the IICP would allow priority break in of calls having high priority or emergency messages during other calls.

The IICP would also have a reminder feature using a modifiable calendar and possible active user request. The IICP would store calendar information input by the user and retrieve this information at later times if requested by the subscriber. Further, the IICP could be placed in an active reminder mode where the IICP would remind the subscriber of a scheduled event at a predetermined time before the scheduled event and initiate a scheduled call at the intended time. The reminder feature could be entered by the subscriber by voice command, touch-tone pad or key pad.

Hardware Configuration

As shown in FIG. 1, the IICP 10 possesses a real-time processor 12 coupled to RAM or other memory 13. The real-time processor is coupled to a multi-channel universal asynchronous real-time controller 14 which is coupled to multiple RS232 ports 16. The multiple RS232 ports 16 would be capable of coupling the IICP to a keyboard 58, magnetic card reader/writer 60 or a personal computer 62.

The real-time processor 12 would also be coupled to a solid state storage for mail and control information and databases 18, and a firmware module 20 capable of maintaining the program and control program for the real-time processor in the IICP 10. Video mixer and digitizer 22 would also be coupled to the real-time processor 12. The video mixer and digitizer 22 would be coupled to a video I/O jack 24 which can support connections to a TV, VCR, or VTR 64.

The real-time processor 12 would also be coupled to analog security encryption/de-encryption modules 34 which are coupled to signal switching and audio mixing controller 36. Signal switching and audio mixing controller 36 would be coupled to DTMF signal encoder/decoder 32, analog-to-digital and digital-to-analog convertor 30, a voice recognition and voice synthesizer module 38 and fax/modem I/O to RS232 port convertor module 26. These last modules and controllers 32, 30, 28 and 26 would also be coupled to the real-time processor 12.

A digital I/O interconnect 44 would also be coupled to the real-time processor 12 and an infrared transceiver 50 outside the IICP 10. The infrared transceiver 50 is used for remote control in the local area of the IICP. Through the use of the infrared transceiver 50, household sensors and relays may be detected and controlled thereby allowing a remote subscriber to control alarms, appliances, lighting, locks, etc. A TELCO cellular I/O connection (RJ11) 42 is coupled to the signal switching and audio mixing controller 36 inside the IICP 10. The cellular connection is coupled to the TELCO lines and airwaves 52. A station set I/O connector 40 is coupled to the signal switching and audio mixing controller 36. This station set I/O connector 40 is coupled to the station set used by the subscriber with the touch-tone key pads 54. An audio I/O connector 38 is coupled to the signal switching and audio mixing controller 36 inside the IICP 10 thereby supporting a connection to a TV, VCR, microphone or speaker 56 outside the IICP 10.

The IICP would be powered by power company lines. A backup battery which is trickled charged connected to the telephone company power source should be sufficient to run the IICP 10 in a power failure situation. A larger battery may be necessary to support a larger IICP for other users. If power company lines do not re-initiate prior to the failure of the battery, a controlled shutdown program will be run by the IICP.

Figure 2:
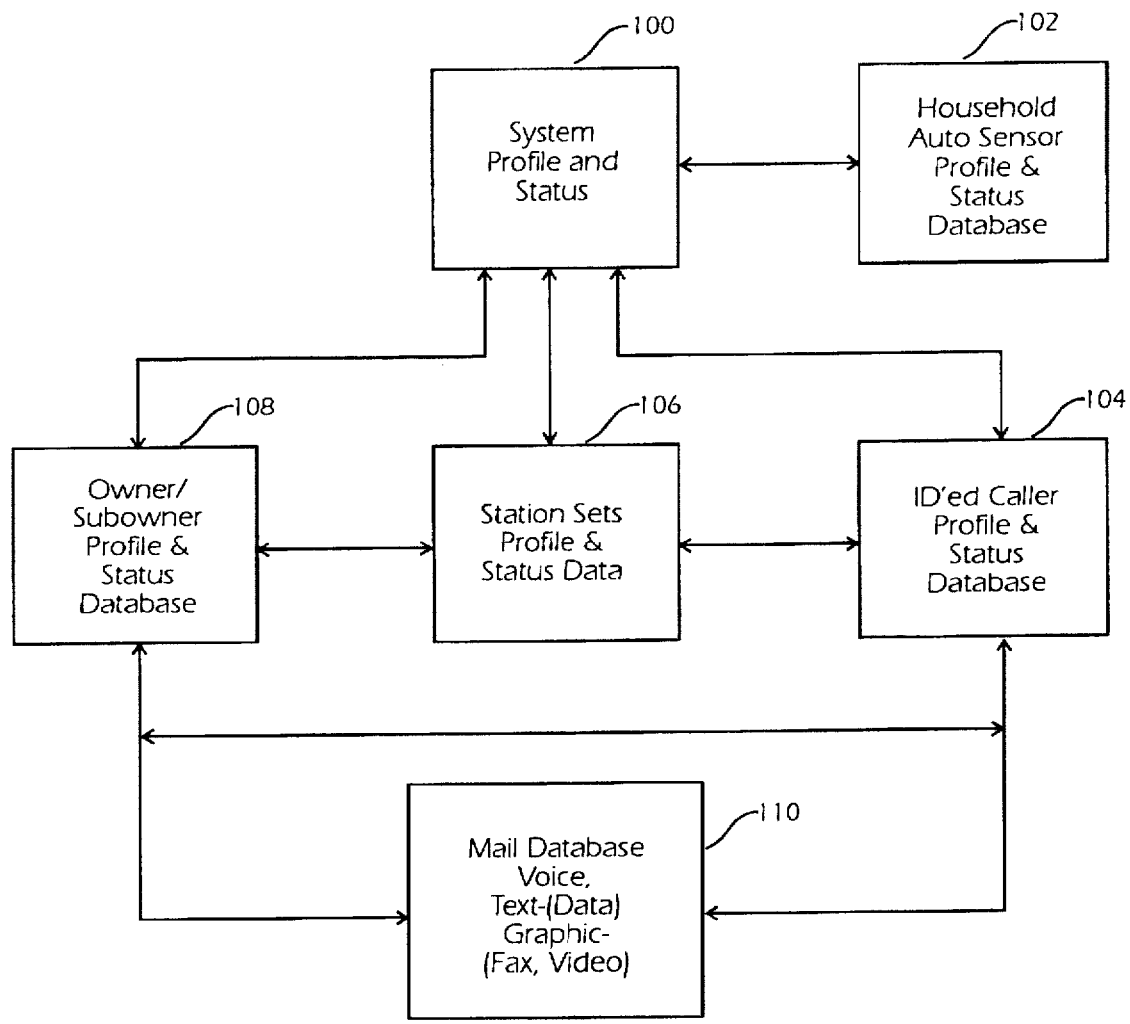
FIG. 2 is a block diagram of the data structures used in the IICP.

FIG. 2 discloses a data structure block diagram for the IICP. Block 100 describes the system profile and status which should be maintained in the database. System Profile and Status 100 would also maintain information from household automatic sensor profile and status database 102, ID caller profile and status database 104, station sets profile and status database 106 and owner/subowner profile and status database 108. A mail database 110 would maintain voice, text and graphic information. This database would allow access to the other databases as well as specific connections with databases on a profile 108 and ID caller profile 104. Further, owner profile database 108 is coupled directly to station set profile database 106 and ID caller profile database 104. Station set profile 106 is also coupled to ID caller profile 104.

Figure 3:
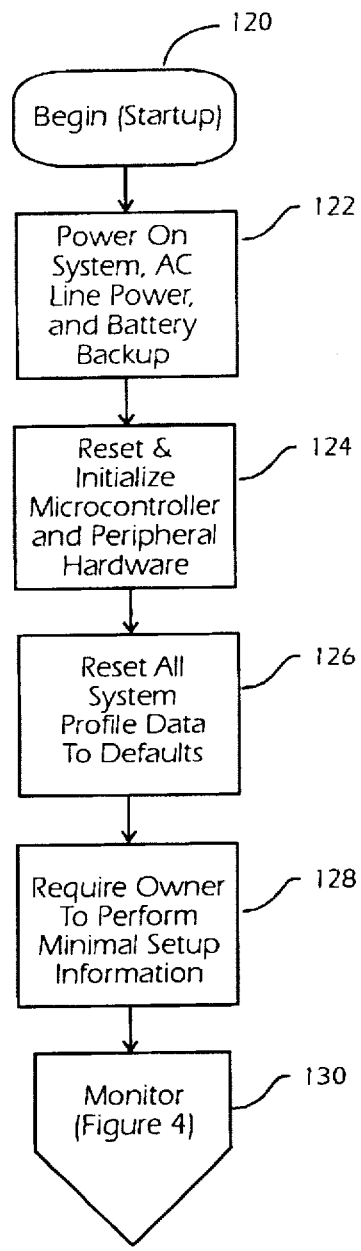
FIGS. 3–17 are flow charts disclosing the operation of the IICP.

As shown in FIG. 3, a flow chart for the initialization of the IICP is shown beginning at step 120. After step 120, step 122 sets the power on to the system and satisfies IICP line power and battery backup power. After step 122, the operation of the IICP proceeds to step 124 where the IICP is re-set and the microprocessor and peripheral hardware is initialized. After step 124, the IICP operation proceeds to step 126 where all system profile data and defaults are re-set. After step 126, the IICP will require the owner to perform minimal set-up by inputting certain information in step 128. After step 128, the IICP will monitor the communications environment in step 130.

Figure 4:
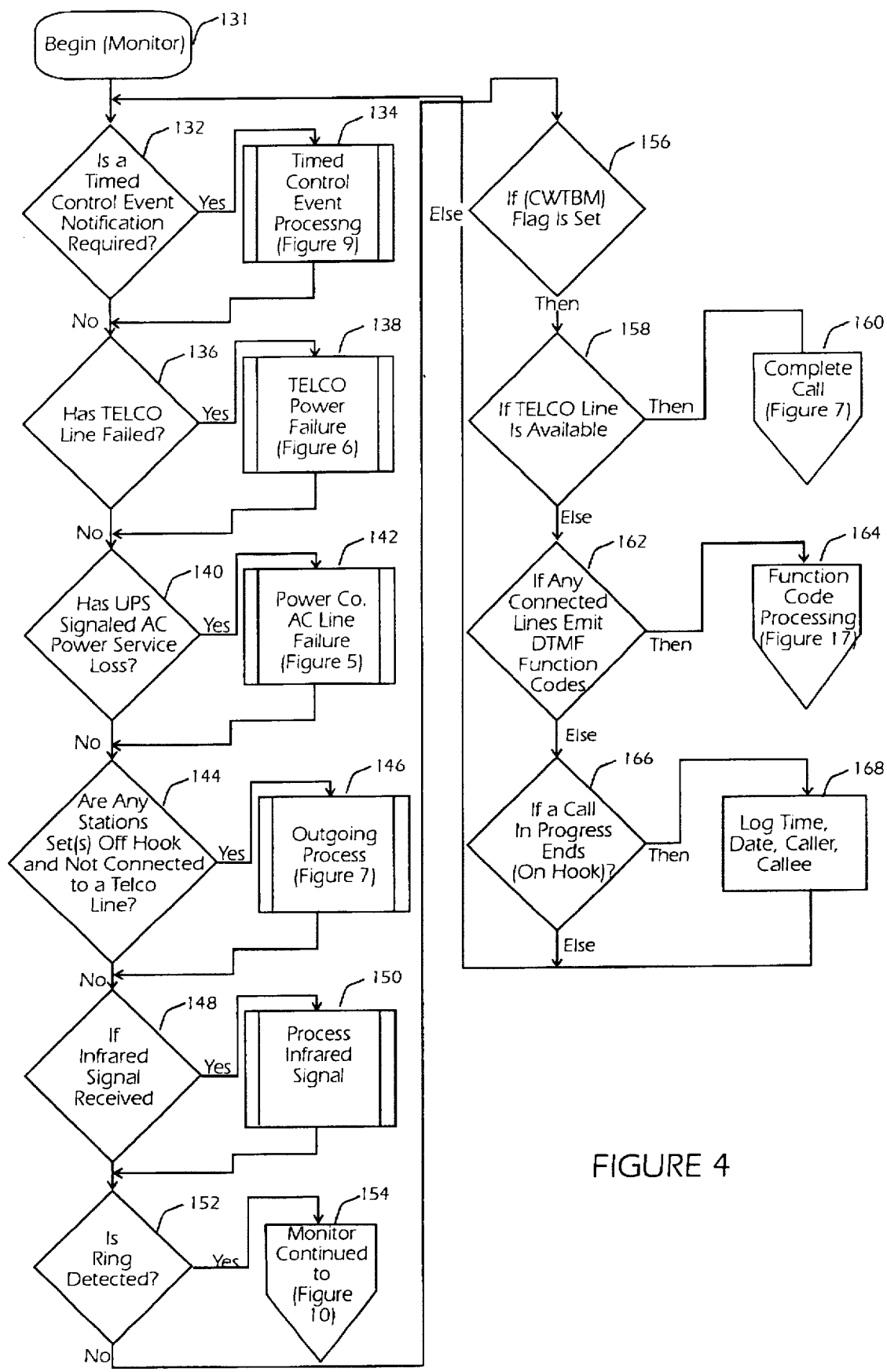
Figure 9:
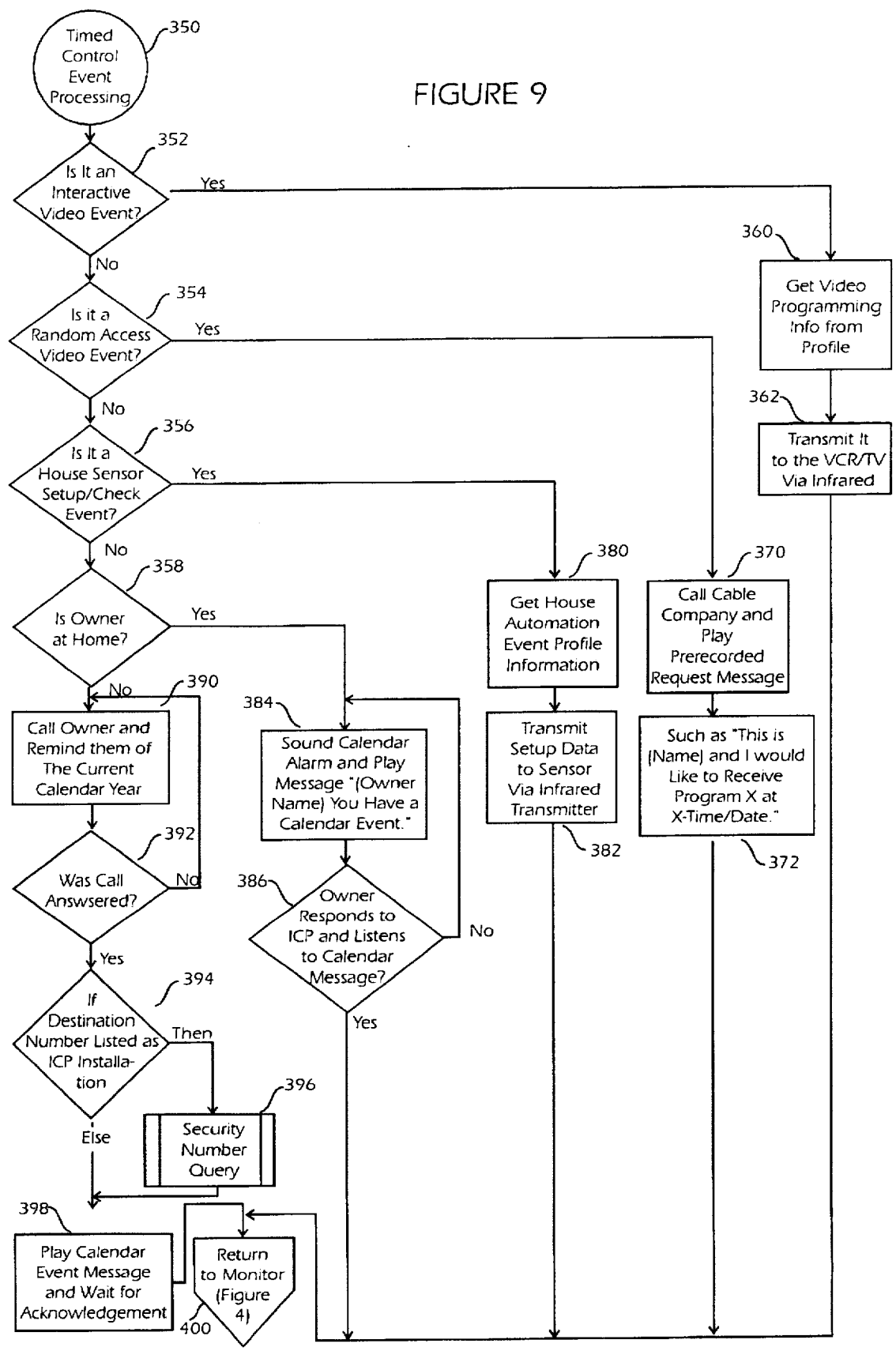

As shown in FIG. 4, the IICP is beginning its monitor routine in step 131. After step 131, the IICP operation proceeds to step 132 where the IICP performs the inquiry as to whether a time control event notification is required. If a timed control event notification is required, the operation of the IICP proceeds to step 134 where the time control event is processed as shown in FIG. 9. This processing would include updating any calendar or scheduling events and requesting information as to whether the scheduled event will require any active notification by the IICP to the subscriber and at what location this notification would be sent.

If the answer to the time control inquiry in step 132 is no or after the timed control event processing in step 134, the operation of the IICP proceeds to step 136 where the IICP determines whether the telephone company line coupled to the IICP has failed. If the telephone line has failed as determined in step 136, the operation of the IICP proceeds to step 138 where the power failure is analyzed. Step 138 is further set out in the operation of the IICP in FIG. 6.

Figure 5:
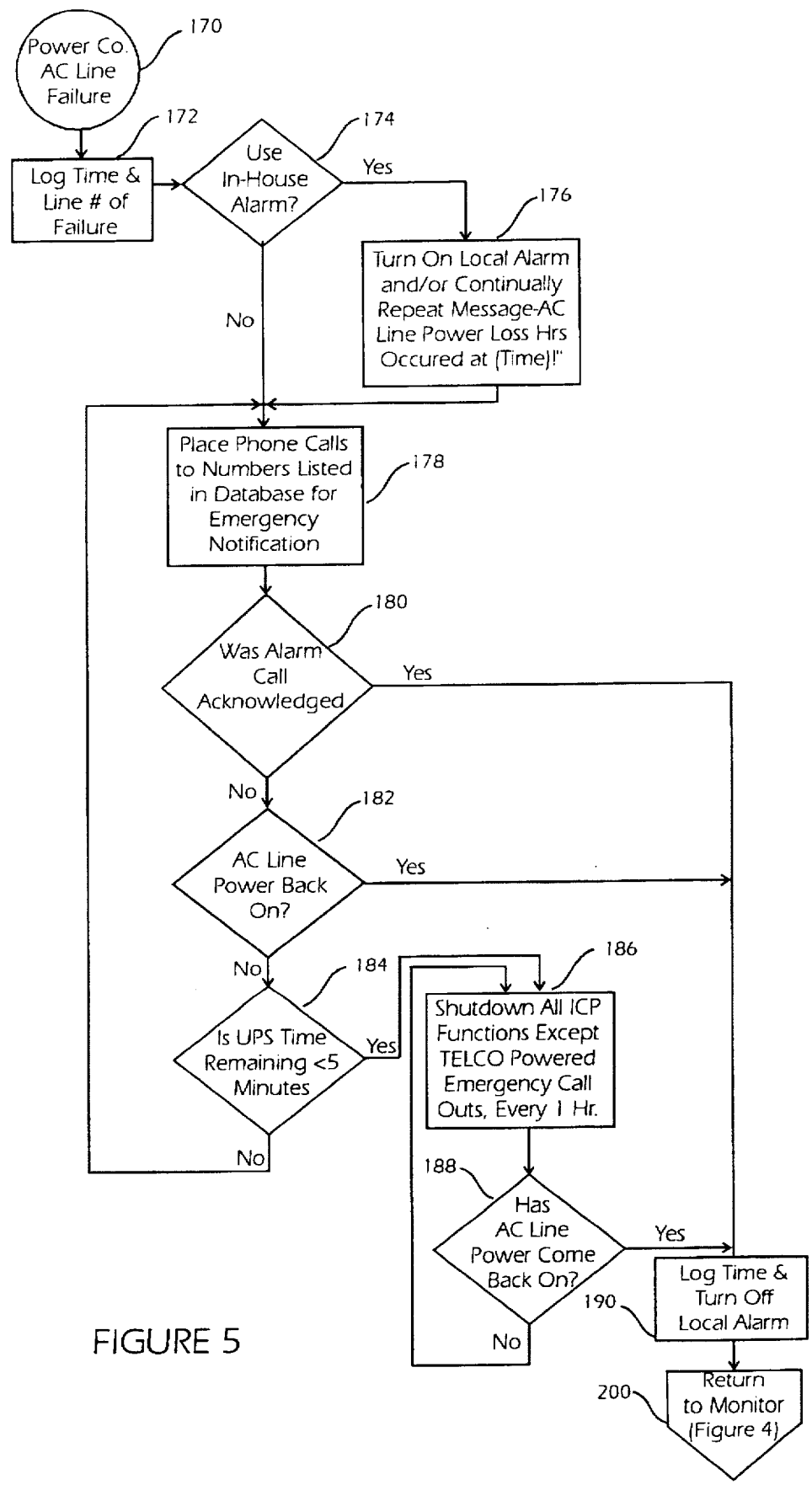

If there is no telephone company line failure as determined in step 136, the operation of the IICP will proceed from step 136 to step 140. After step 136 and/or step 138, the operation of the IICP proceeds to step 140 where the IICP determines whether AC power service has been lost. If there is an AC power line failure, the IICP will proceed to step 142 where the power company line AC line failure will be analyzed as shown in FIG. 5. If there is AC power line failure in step 140, the operation of the IICP will proceed directly to step 144. After the operation of step 142, the operation of the IICP will also proceed to step 144.

Figure 7:
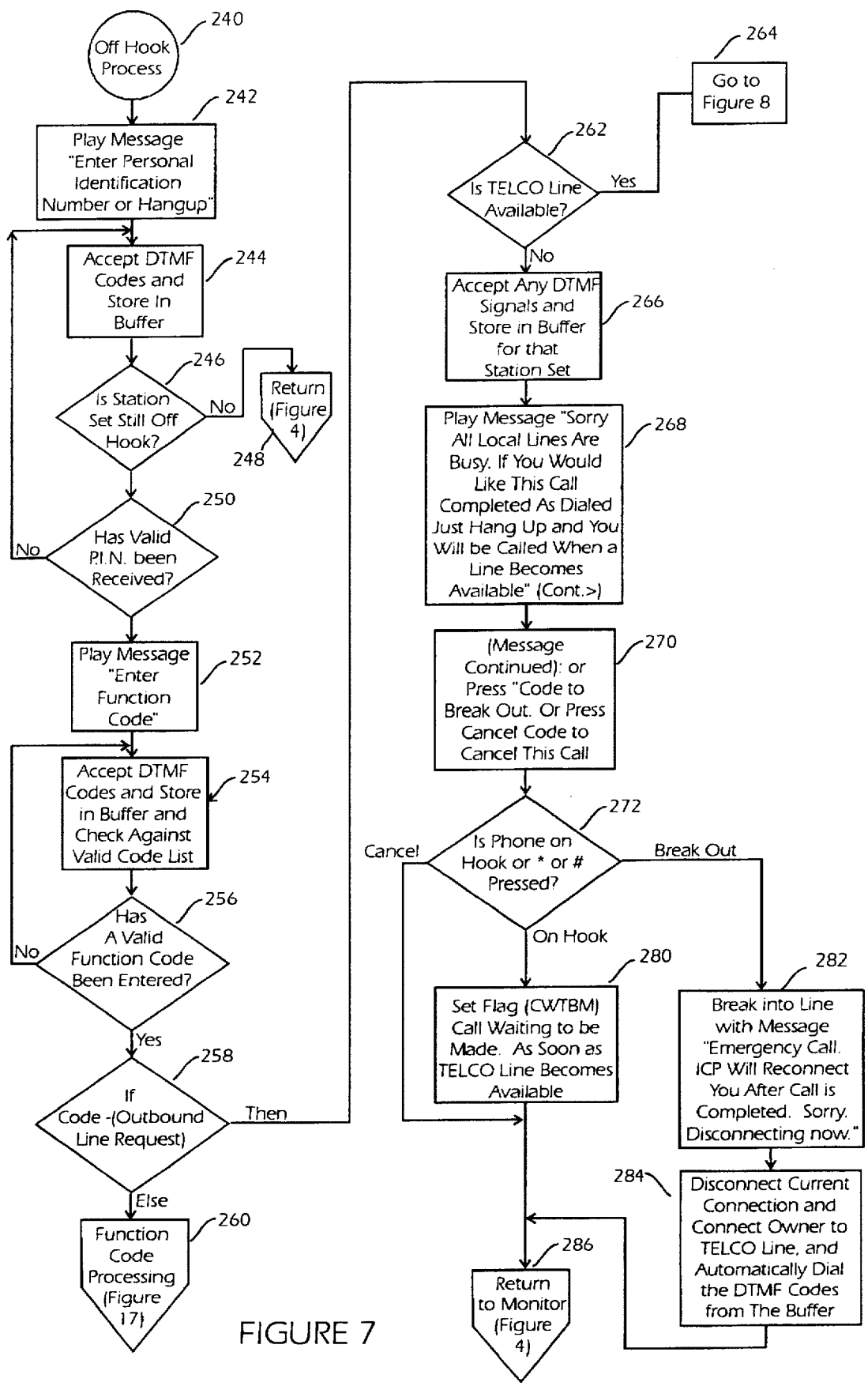

In step 144, the IICP will determine if any station sets coupled to the IICP are off-the-hook or not connected to a telephone line. If there are no station sets off-the-hook or not connected to a telephone company line, the operation of the IICP will proceed directly to step 148. If there are station sets off-the-hook or not connected to a telephone company line as determined in step 144, the operation of the IICP will proceed to step 146 where the outgoing process will be accomplished as shown in FIG. 7. After the operation of FIG. 7, the IICP will return its operation to FIG. 4 and step 148.

In step 148, the IICP will determine if an infrared signal has been received. If no infrared signal has been received by the IICP, the operation of the IICP will proceed to step 152. If an infrared signal has been received by the IICP in step 148, the IICP will proceed to step 150 where it will process the infrared signal. Again, the infrared signals would be used to remotely control household systems or sensors at the subscriber location. These remote control operations are wide-ranging and could include many different functions. After step 150, the operation of the IICP will proceed to step 152.

Figure 10:
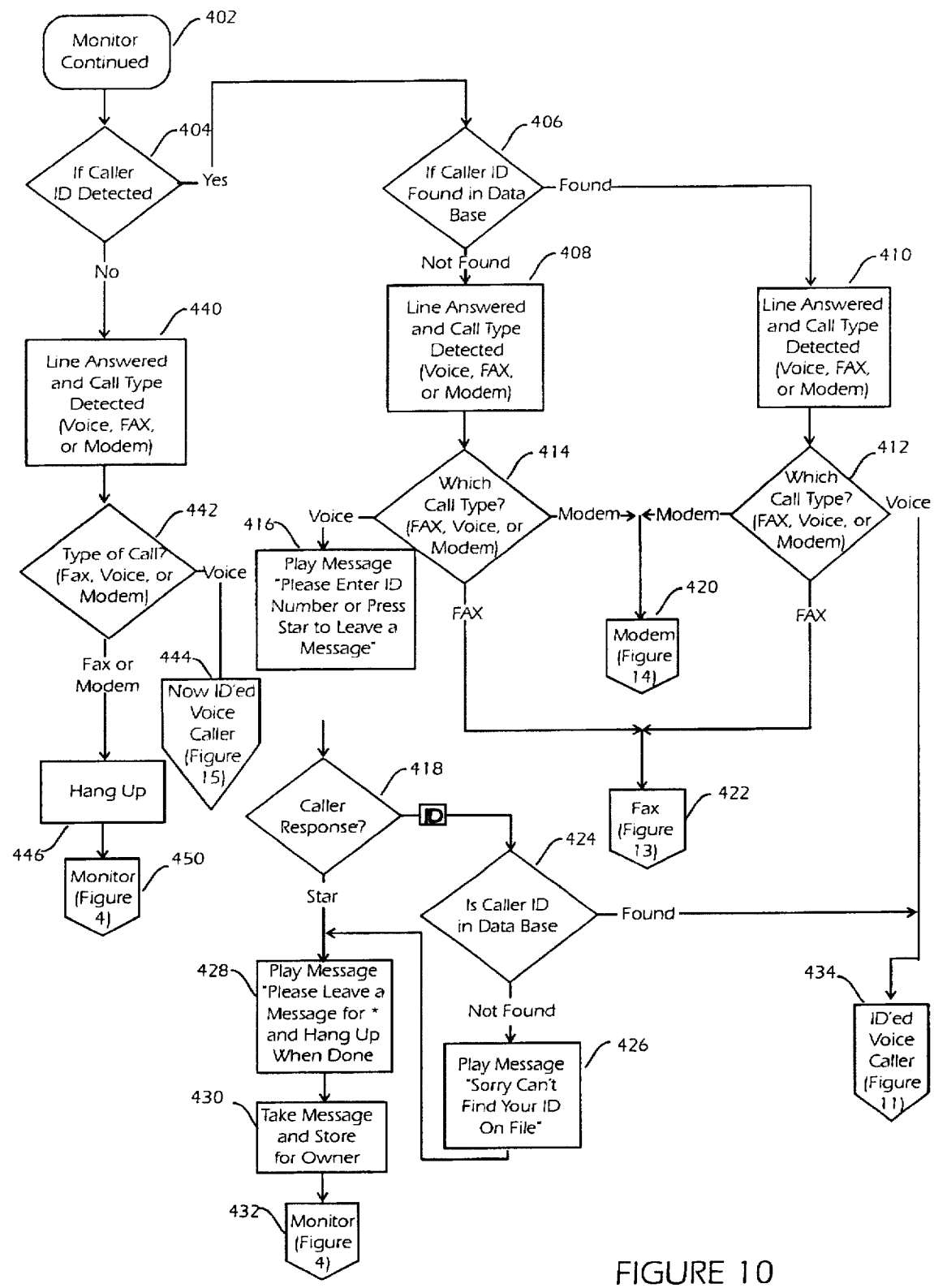

In step 152, the IICP will determine if a ring has been detected. If no ring has been detected, the operation of the IICP will proceed to step 156. If a ring has been detected in step 152, the operation of the IICP will proceed to step 154 where the monitor program will be continued as shown in FIG. 10.

As shown in step 156, the IICP will determine if the CWTBM flag is set. If the flag is set, the operation of the IICP will proceed to step 158. Otherwise, the IICP will move its operation back to the beginning of the monitor sequence as shown in FIG. 4 beginning just after step 131 and proceeding to step 132. If the operation of the IICP proceeds to step 158, the IICP will determine if a telephone company line is available. If a telephone company line is available as determined in step 158, the operation of the IICP will transfer to step 160 where the operation of the IICP will be controlled by FIG. 7. If no telephone company line is available as determined in step 158, the operation of the IICP will proceed to step 162 where the IICP will determine if any connected lines have emitted DTMF function codes.

Figure 17:
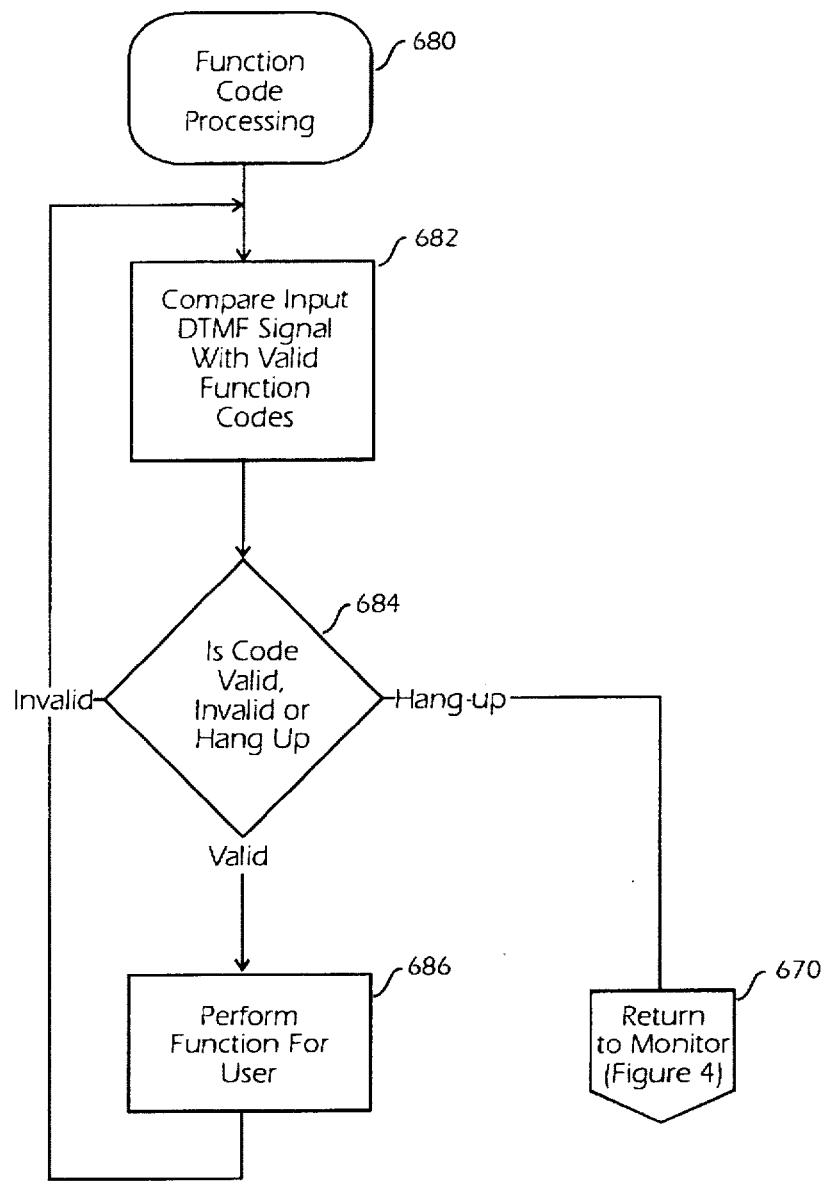

If the IICP determines that any connected lines emitted DTMF function codes, the operation of the IICP will proceed to step 164 where the function code processing will be accomplished as shown in FIG. 17. If no lines are connected which emit a DTMF function code, the IICP will proceed to step 166 where the IICP will determine if a call in progress has ended. If the IICP determines that the call in progress has ended in step 166, the operation of the IICP will proceed to step 168 where the IICP will log the time, date, caller and callee in the database and proceed back to the beginning of the monitor program and step 132. If the IICP determines that there is no end to the call in progress, the operation of the IICP will proceed directly from step 168 back to the beginning of the monitor routine and begin operation at step 132.

FIG. 5 shows the operation of the IICP in case of an AC line power failure beginning at step 170. After step 170, the operation of the IICP proceeds to step 172 where the IICP will log the time and the line number of the failure. After step 172, operation proceeds to step 174 where the IICP will use an in-house alarm to alert individuals of the AC line failure. If a local alarm has been set to go off in this situation, the operation of the IICP proceeds to step 176 where the local alarm is turned on and continually repeats a message that the AC line power failure loss occurred at a particular time. After the operation of step 176, the IICP proceeds to step 174.

If the IICP determines that the in-house alarm is not to be used in step 174, operation of the IICP proceeds to step 178 where the IICP will place phone calls to numbers listed in the database for emergency notification in step 178. After step 178, the IICP will proceed to step 180 where the IICP will determine if the alarm call was acknowledged. If the alarm call was acknowledged in step 180, the operation of the program proceeds to step 190 where the IICP will log the time and turn off the local alarm. After step 190, the IICP will return to the monitor program shown in FIG. 4 as denoted in step 200.

If the alarm call was not acknowledged in step 180, the operation of the program proceeds from step 180 to step 182 where the IICP checks to see if the AC power line is back on. If the AC power line was back on as determined in step 182, the operation of the IICP proceeds to step 190 and returns to the monitor program as shown in FIG. 4. If the IICP determines that the AC power line is not back on in step 182, the operation of the IICP proceeds to step 184 where the UPS time is determined to be less than five (5) minutes.

If the UPS time remaining is less than five (5) minutes, the operation of the program proceeds to step 186 where a control shutdown is effected of all IICP functions except the telephone company powered emergency call out every hour. After step 186, the operation of the IICP proceeds to step 188 where the IICP determines whether the AC power has come back on. If the AC power has come back on as determined in step 188, the operation of the IICP proceeds from step 188 to step 190 where the time is logged and the local alarm is turned off followed by step 200 where the monitor program in FIG. 4 is returned to. If the AC power is not determined to be back on as determined in step 188, the operation of the IICP will shift back to step 186 for the shutdown function procedures and emergency calls every hour. If the UPS time is not less than five (5) minutes, the operation of the program proceeds from step 184 back up to step 178 and repeats through the preceding steps.

Figure 6:
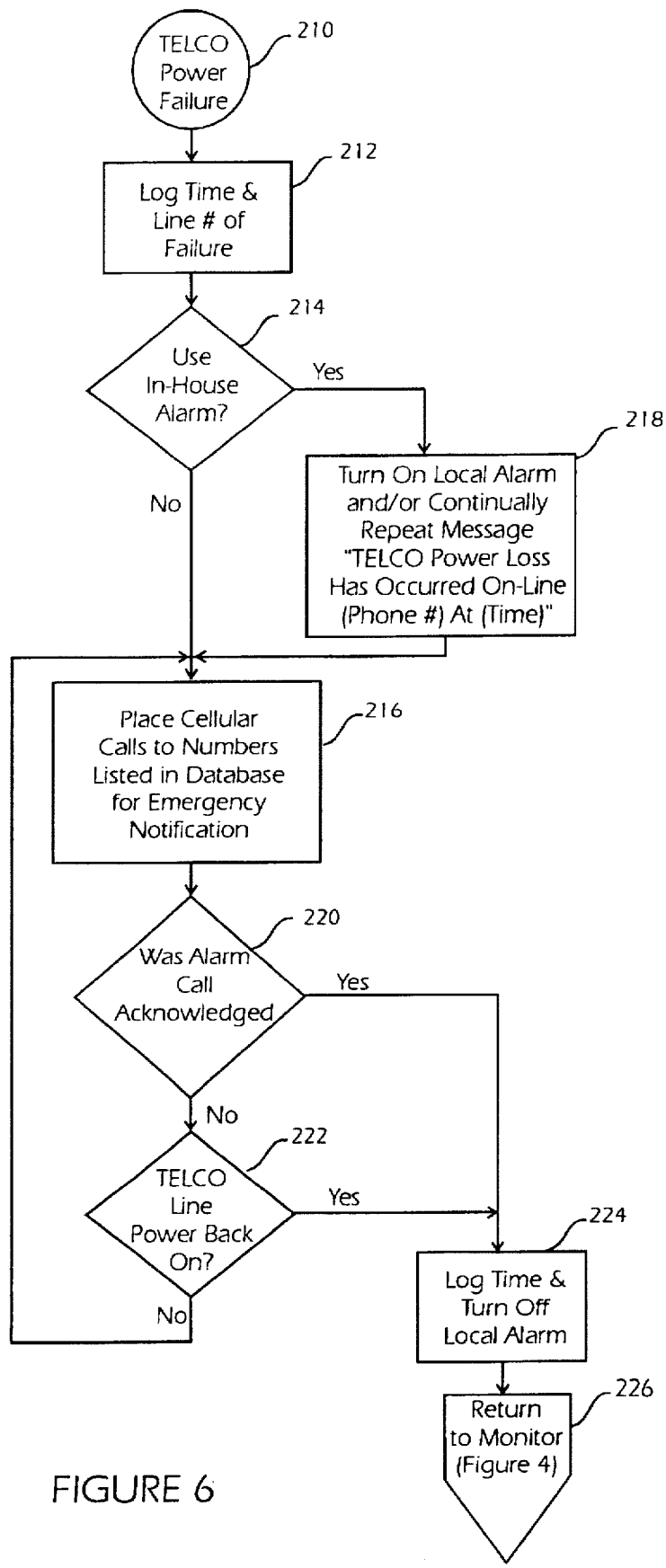

As shown in FIG. 6, if a telephone company power failure is recognized, operation of the program proceeds to step 210 in FIG. 6. After step 210, operation of the IICP proceeds to step 212 where the time is logged and the line of the failure is stored in memory. After step 212, the operation of the IICP proceeds to step 214 where the IICP determines whether it is configured to turn on a local alarm. If so, the operation proceeds to step 218 where the local alarm is turned on and continually repeats a message that telephone company power loss occurred on a certain line at a specific time. After step 218, the operation of the IICP proceeds to step 216. Further, if the in-house alarm is not configured to be initiated by the IICP in step 214, the operation of the IICP proceeds directly from step 214 to step 216.

In step 216, the IICP will place cellular calls to numbers listed in the database for emergency notification. After step 216, the IICP will determine whether the alarm call was acknowledged, and if so, the operation will proceed to step 224 where the time will be logged and the local alarm will be turned off. If the alarm call was not acknowledged in step 220, the operation of the IICP will proceed to step 222 where the IICP will determine whether the telephone company line power is back on. If so, operation will proceed to step 224 where the time will be logged and the local alarm will be turned off. After step 224, the operation of the IICP will return to the monitor routine in FIG. 4 as shown in step 226. If the telephone company power is not determined to be back on as in step 222, the operation of the IICP will proceed back up to step 216 where emergency calls will be made from numbers listed in the emergency database.

FIG. 7 shows the outgoing call processing steps starting at step 240. After step 240 where the IICP determines that handset for the subscriber's telephone is off-the-hook, the IICP operation proceeds to step 242 where the IICP will play a message requesting the identification number or that subscriber hang up. After step 242, operation of the IICP proceeds to step 244 where DTMF codes heard and stored in buffers. After step 244, the IICP operation proceeds to step 246 where the IICP determines if the station set is still off-the-hook. If the station set is still off-the-hook, the operation proceeds to step 250 where the IICP determines whether a valid personal identification number has been received. If the station set is not off-the-hook as determined in step 246, the operation of the IICP returns to the monitor operation as shown in FIG. 4 in step 248.

If an invalid personal identification number is received by the station set in step 250, the operation of the IICP proceeds to step 244. If a valid personal identification number is received in step 250, the IICP will play a message requesting that the user enter the function code in step 252. After step 252, the operation of the IICP proceeds to step 254 where the IICP will accept DTMF codes and store the function codes in a buffer and check those codes against a valid code list. After step 254, the operation of the IICP proceeds to step 256 where the function codes input into the IICP are checked to see if they are valid function codes. If not, operation proceeds back up to step 254 to accept other codes. If valid function codes have been entered in step 256, the operation of the IICP proceeds to step 258 where the IICP determines if the outbound line request code has been entered. If so, operation of the IICP proceeds to step 262. Otherwise, operation of the IICP proceeds to step 260 where the function code processing occurs as shown in FIG. 17.

Figure 8:
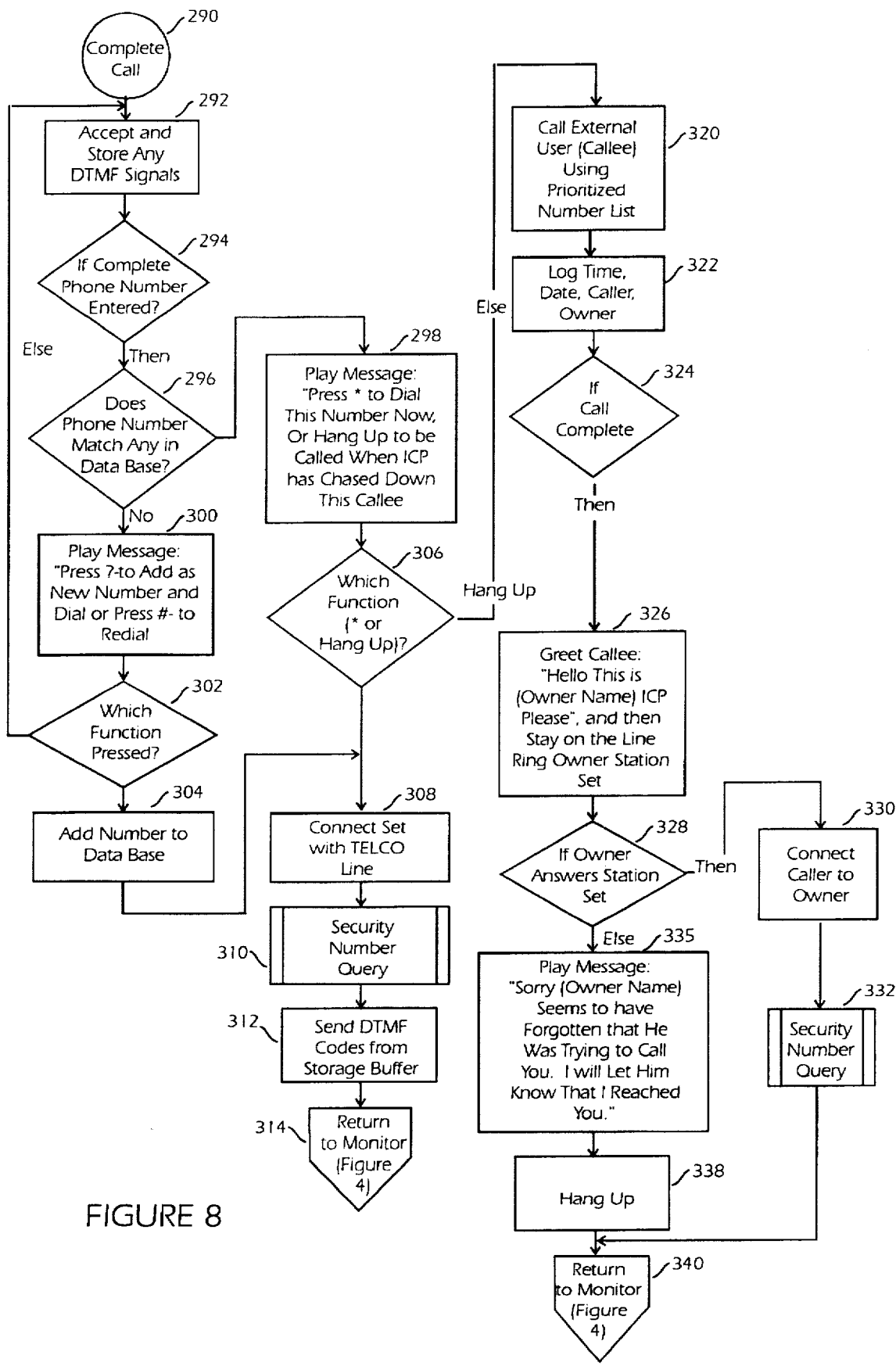

Operation of the IICP proceeds to step 262 where the IICP determines whether a telephone company line is available. If so, operation of the IICP proceeds to step 264 which is shown in FIG. 8. Otherwise, the operation of the IICP proceeds from step 262 to step 266 where the IICP will accept any DTMF signals and store those signals in a buffer for that station set. After step 266, operation of the IICP proceeds to step 268 where the IICP will play a message that all local lines are busy and that if you would like to complete the call as dialed, just hang up and you will be called back by the IICP when a line becomes available. Further, after operation of step 268, a message will continue to be played in step 270 to the effect that if you would not like to complete the call as dialed, you can press a code to breakout or press cancel code to cancel the call in step 270. After step 270, operation of the IICP proceeds to step 272 where the IICP determines if the phone is on the hook or other touch-tone codes have been pressed. If the call has been canceled, operation of the IICP proceeds from step 272 down to step 278 where the operation of the IICP returns to the monitor program shown in FIG. 4.

If the phone is still on the hook as determined by step 272, operation of the IICP proceeds to step 280 where the IICP will set a flag CWTBM and the call-waiting will be made as soon as the telephone company line becomes available. After step 280, the operation of the IICP will proceed to step 286 where the operation of the program will return to the monitor program shown in FIG. 4. If a breakout code is determined to have been set in step 272, the operation of the IICP will proceed to step 282 where the existing calls will be broken into and a message "Emergency call. IICP will reconnect you after the emergency call has been completed. Sorry for disconnecting now." will be made. Essentially, existing calls will be suspended until an emergency call can be made in step 284 and the operation of the IICP will proceed to step 284 where the IICP will disconnect the current connection and connect the owner to the telephone company line and automatically dial the DTMF codes from the buffer. Following this disconnection, operation of the IICP will proceed from step 284 to step 286 which will return to the monitor program shown in FIG. 4.

After step 264, the operation of the IICP will proceed to step 290 in FIG. 8. After step 290, operation of the program will proceed to step 292 where the IICP will store and accept the DTMF signals input into the station set. After step 292, the operation of the IICP will proceed to step 294 where the IICP will determine if a complete number has been entered. After a complete number has been entered as determined in step 294, the IICP operation will proceed to step 296 where the IICP will determine if any numbers in the database match the input phone number. If so, operation will proceed to step 298 where a message is played "Press the * to dial this number now or hang up to be called when the IICP has chased down this callee". If the phone number does not match the numbers in the database, the operation will proceed to step 300 where a message will play press # to add as a new number or dial or press * to redial. After step 300, operation proceeds to step 302 where the IICP will determine which function was pressed followed by step 304 which will add the number to the database if that is the function code determined by the subscriber/user. Following step 304, operation proceeds to step 308 where the IICP will connect the station set of the telephone line.

After the operation of the IICP in step 298, the IICP will determine which function has been determined by the subscriber/user in step 306. If the function is to dial now, the operation of the IICP will proceed to step 308 which will connect the station set to the telephone line. After the operation of step 308, a security number query will be accomplished in 310 if the IICP is required to input the security number. After operation of step 310, the IICP will send a DTMF code from the storage buffers in 312 and return to the monitor program shown in FIG. 4 as denoted in step 314.

If the function code as determined in step 306 is a hang up and wait until the IICP has chased down the callee, operation proceeds to step 320 where the external user is called using a prioritized number list. After step 320, operation proceeds to step 322 where time, date, caller and owner are logged into the database. After step 322, the IICP determines whether the call is completed in step 324. When the call is completed as determined in step 324, the operation of the IICP proceeds to step 326 which greets the designated callee with the message "Hello, this is the owner/ subscriber's name IICP stay on the line until the IICP can ring the owner station set". After step 326, the operation of the IICP proceeds to step 328 where the IICP determines if the subscriber answers the station set. When the subscriber answers the station set as determined in step 328, the operation of the IICP proceeds to step 330 where the callers are connected to the owner followed by step 332 where a security number query is accomplished if necessary. Following step 332, the IICP proceeds to step 340 where the IICP will return to the monitor program shown in FIG. 4.

If a subscriber never answers the call back for the call in step 328, the operation of the IICP proceeds to step 335 where the IICP will play a message to the designated callee that the IICP is "Sorry, but the subscriber seems to have forgotten that he was trying to call you." and that the IICP will let him know that his intended caller was reached. Following step 335, the IICP will hang up in step 338 and return to the monitor program shown in FIG. 4 in step 340.

Timed control event processing is shown in FIG. 9 beginning at step 350. After step 350, the operation of the IICP proceeds to step 352 where the IICP determines if the timed control event processing is an interactive video event. If so, operation proceeds to 360 where the video programming information is collected and 362 where the video information is transmitted to the VCR via the infrared transmitter. Following step 360, the operation of the IICP proceeds to step 400 where the IICP will return to the monitor program shown in FIG. 4.

If the timed control event is not an interactive video event as determined in step 352, the operation of the IICP proceeds to step 354 where the IICP determines if the timed control event is a random access video event. If so, operation of the IICP proceeds to step 370 where the IICP calls the cable company and plays a pre-recorded request message such as shown in step 372 where the message states that this is subscriber and the subscriber would like to receive program access at X time and date. Following the operation of step 372, the IICP will proceed to step 400 which will return to the monitor program shown in FIG. 4.

If the timed control event is not a random access video event as determined by the IICP in step 354, the operation of the IICP will proceed to step 356 which will determine whether the timed control event is a house sensor setup/ check event. If so, operation of the IICP will proceed to step 380 where the IICP will get house automation event profile information and step 382 where the IICP will transmit set-up data to sensor via the infrared transmitters in step 382. After step 382, the operation of the IICP will proceed to step 400 which will return to the monitor program shown in FIG. 4.

If the timed control event processing is not a house sensor set-up/check event as determined in step 356, the operation of the IICP proceeds to step 358 which determines whether the owner/subscriber is at home. If so, the operation of the IICP proceeds to step 384 which will sound the calendar alarm and play the message "owner, you have a calendar event". Following step 384, the operation of the IICP proceeds to step 386 which determines whether the owner has responded to the IICP and listens to the calendar message. If so, the operation of the IICP proceeds to step 400 which will return to the monitor program shown in FIG. 4. Otherwise, the operation will proceed back up to step 384 which will replay the message that the owner has a calendar message.

If the owner is not home as determined in step 358, the IICP operation will proceed to step 390 which will call the owner and remind them of the current calendar year. The IICP will then proceed to step 392 which will determine whether the call was answered. If not, the IICP operation will proceed back up to step 390. If the call was answered as determined in step 392, the operation of the IICP will proceed to step 394 which will determine if the destination number is listed as an IICP installation. If so, the operation will proceed to step 396 which will perform a security number query before proceeding to step 398. If the destination number is not listed as an IICP installation, the operation of the IICP will proceed directly from step 390 forward to step 398. In step 398, the IICP will play the calendar event message and wait for acknowledgment. Following step 398, the IICP will proceed directly to step 400 which will return to the monitor program shown in FIG. 4.

Continuation of the monitor program is shown in FIG. 10 beginning at step 402. After step 402, the operation of the IICP proceeds to step 404 where the IICP determines if the caller identification is detected. If not, the operation of the IICP proceeds directly to step 440 where the line is answered and the call type is detected. Call types include voice, fax or modem. After step 440, the IICP determines the type of call in step 442, and if voice proceeds to step 444 where the IICP operation proceeds to the "now ID'ed" voice caller procedure shown in FIG. 15. If the type of call is determined to be a fax or modem call as determined in step 444, the operation of the IICP proceeds to step 446 which proceeds with a hang up and a continuation of the monitor program shown in FIG. 4 in step 450.

Figure 11:
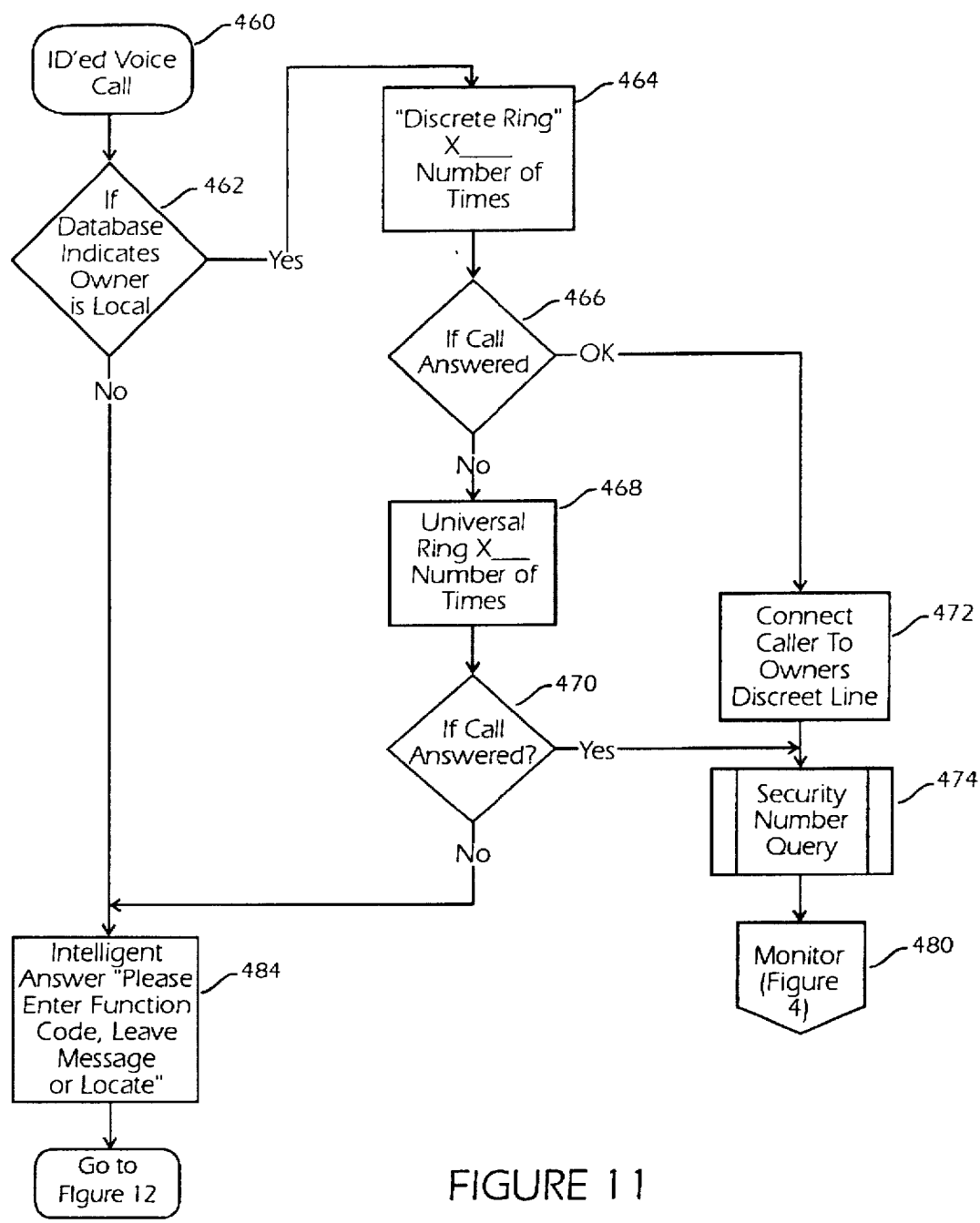
Figure 13:
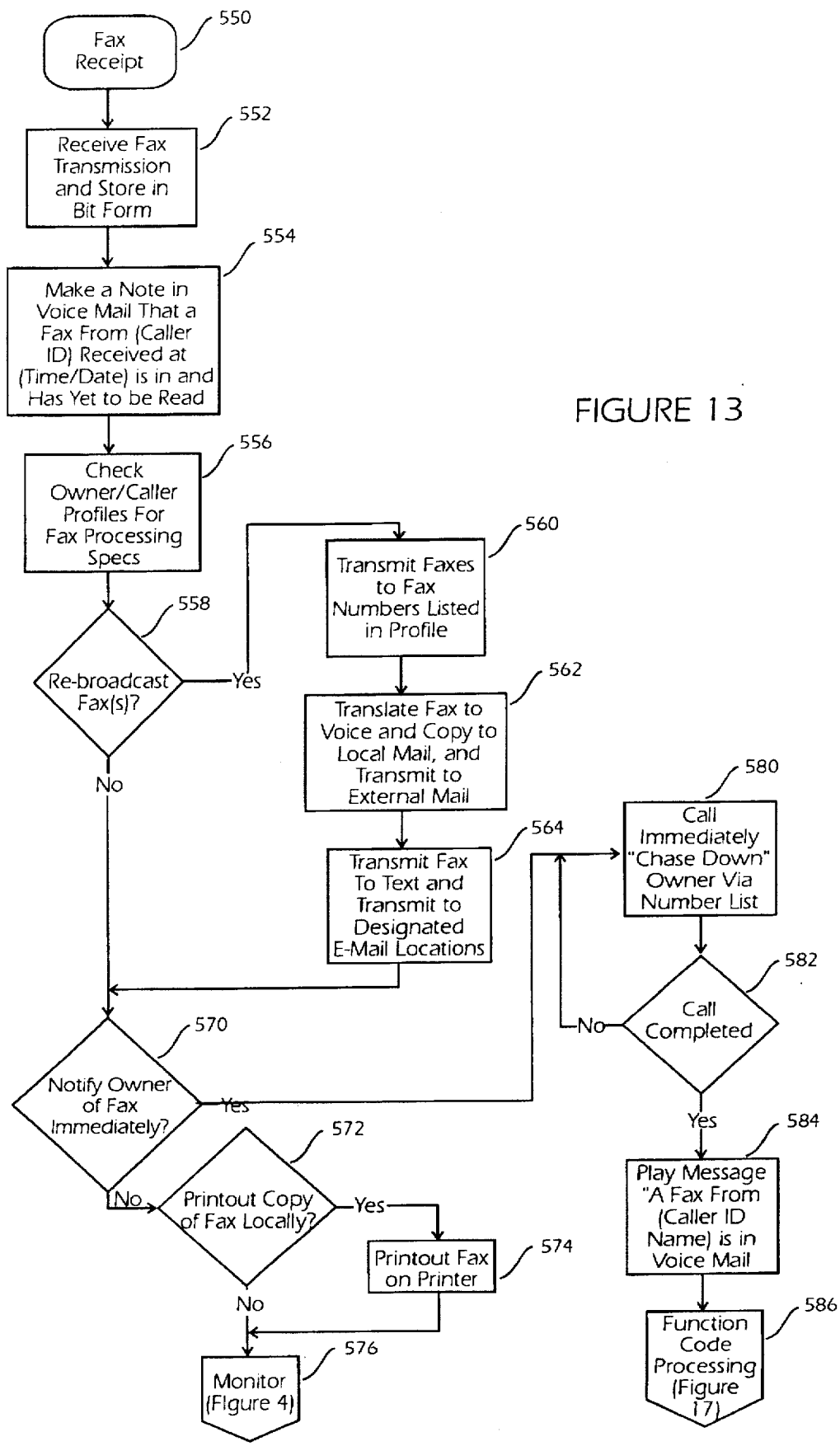
Figure 14:
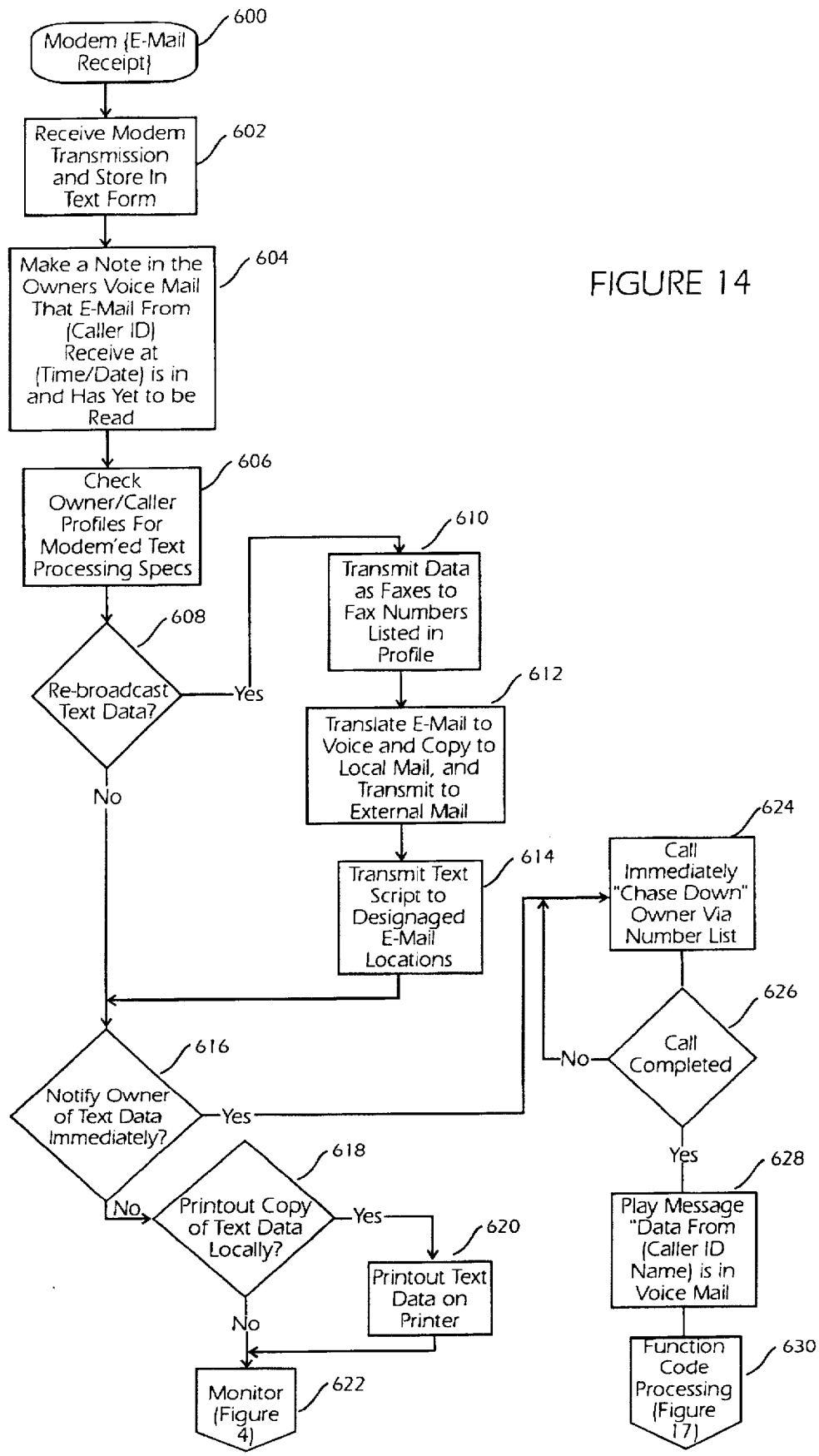

If the called ID is detected in step 404, the operation of the IICP proceeds to step 406 where the call ID is looked for in the database. If the caller ID is found in the database, the operation of the IICP proceeds to step 410 where the line is answered and the type of call is detected. Detection is accomplished in step 412 after step 310. If the call is a voice call, operation of the IICP proceeds from step 412 to step 434 where the ID'd voice caller procedure is accomplished as shown in FIG. 11. If the type of call is determined to be a fax, the operation proceeds from step 412 to step 422 where the fax procedure is accomplished as shown in FIG. 13. If a modem type transmission is determined in step 412, the operation of the IICP proceeds from step 412 to step 420 and the modem procedure is accomplished as shown in FIG. 14.

If the caller ID is not found in the database as determined in step 406, the line is answered and the call type is detected in step 408. After step 408, the call type is detected in the determination step 414. If the call type is a modem call, the operation proceeds from step 414 to step 420 where the modem procedure shown in FIG. 14 is accomplished. If the call type is a fax type, the operation of the IICP proceeds from step 414 to step 422 which performs the fax procedure shown in FIG. 13. If the call type as determined in step 414 is a voice call, operation proceeds from step 414 to step 416 where a message is played to enter the ID number or press * to leave a message. Following step 416, operation proceeds to step 418 where a caller response is determined. If an ID number is accepted in step 418, operation of the IICP proceeds to step 424 where it is determined if the caller ID is in the database. If found, the operation of the IICP proceeds to step 434 where the ID'd voice caller procedure is initiated as shown in FIG. 11. Otherwise, the operation proceeds from step 424 to step 426 where the IICP plays a message that it cannot find your ID in the file and that it is sorry. Following step 426, operation proceeds to step 428. If the caller response is determined to be a * in step 418, operation of the IICP proceeds directly to step 428.

In step 428, the IICP will play a message to please leave a message for the subscriber and hang up when done. Following step 428, operation of the IICP proceeds to step 430 which will take a message and store that message for the subscriber/owner. Following step 430, the operation proceeds to step 432 which will conduct the monitor program shown in FIG. 4.

As shown in FIG. 11, if a caller has input the correct ID code for a voice call, the operation proceeds to step 460 and then to step 462 where the IICP determines if the owner/subscriber is in the local area. If so, the operation proceeds to step 464 where a discrete ring X number of times is accomplished following by step 466 where the IICP determines if the call is answered. If the call is answered as determined in step 466, the operation of the IICP proceeds to step 472 where the connection of the caller to the subscriber/owner is made on a discrete line.

If the call is not answered as determined in step 466, operation of the IICP proceeds to step 468 where a universal ring is accomplished X number of times. Following step 468, the IICP determines whether the call has been answered in step 470. If so, operation proceeds to step 474 where security number query is made. Following step 472, operation also proceeds to step 474 where, as discussed earlier, the security number query is accomplished. Following step 474, the IICP operation proceeds to step 480 where the monitor operation in FIG. 4 is accomplished.

If the call is not answered as determined in step 470, the operation of the IICP proceeds to step 484. Further, if the database indicates that the subscriber/owner is not local in step 462, operation of the IICP proceeds to step 484. In step 484, the IICP is indicated to enter a function code, leave a message or locate the subscriber/owner.

Figure 12:
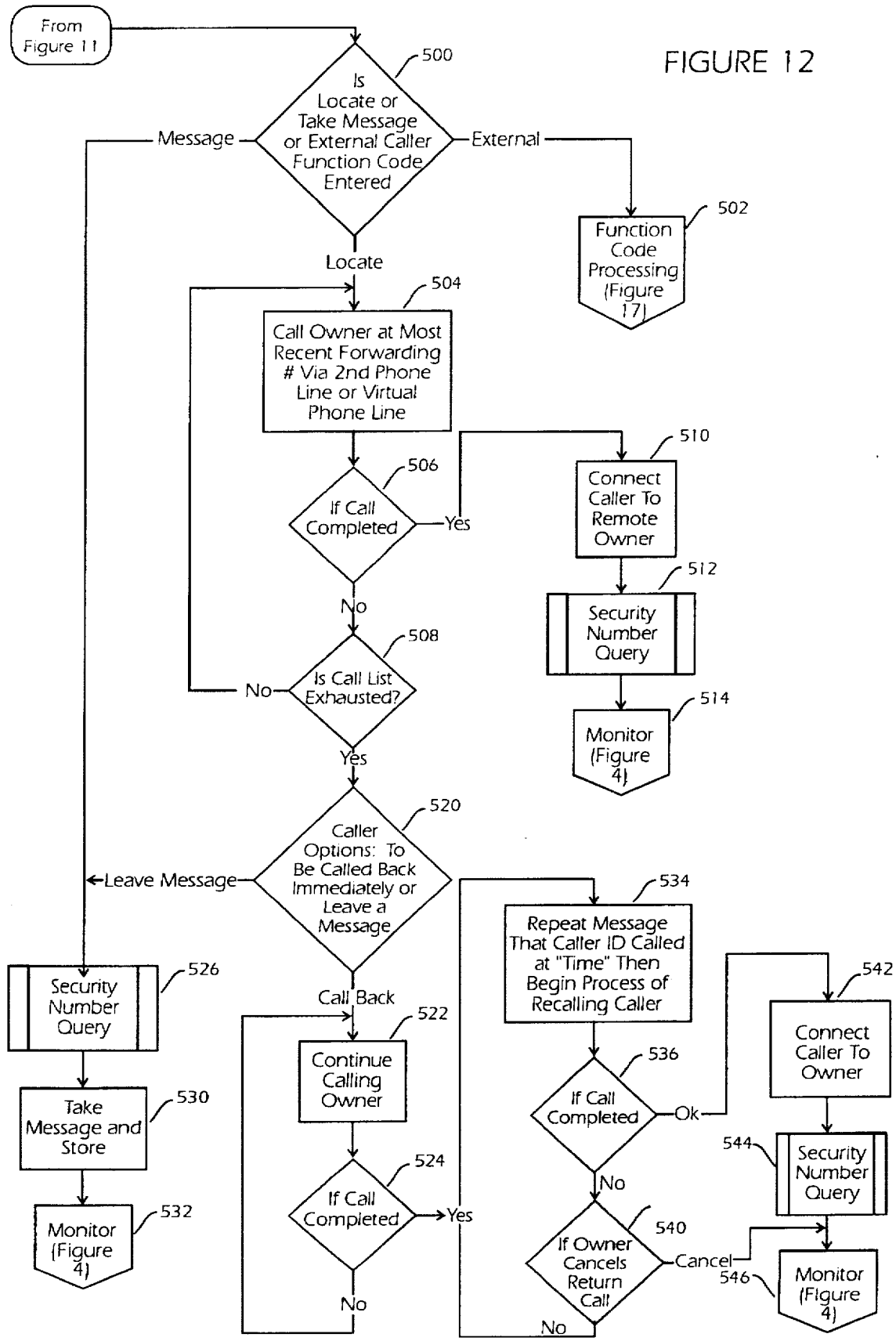

Following step 484, the operation of the IICP proceeds to step 500 in FIG. 12. If the function code is entered, operation of the IICP proceeds from step 500 to step 502 where function code processing occurs as shown in FIG. 17. If the message code is determined by step 500, operation of the IICP proceeds from step 500 to step 526 where there is a security number query. Following step 526, the IICP goes to step 530 to take a message, then to step 532 to return to the monitor program in FIG. 4.

If the locate code is determined to have been entered by the IICP in step 500, operation proceeds to step 504 where the owner is called to the most recent forwarding number via the second phone line or the virtual phone line as supported by the three-way calling feature. After step 504, the operation proceeds to step 506 where the IICP determines that the call is completed. If so, operation proceeds to step 510 where the caller is connected to the remote subscriber/owner, a security number query is performed in step 510, and the IICP returns to the monitor program shown in FIG. 4 as disclosed in step 514.

If the call is not completed by the IICP as determined in step 506, the operation of the IICP proceeds to step 508 where the IICP determines if the call list has been exhausted. If not, the operation of the program proceeds back up to step 504 where the subscriber/owner is called on the second phone line or on the virtual phone line as supported by the three-way calling feature. If the secondary calling list is exhausted as determined by the IICP in step 508, the operation of the IICP proceeds to step 520 where caller options are determined by the IICP.

In step 520, the caller options include that the caller can be called back or a message may be left. If the leave message option is chosen by the caller, the operation of the IICP proceeds from step 520 to step 526 where the security number query is accomplished. Following step 526, the operation of the IICP proceeds to step 530 where a message is taken and stored, and step 532 where the IICP returns to the monitor program shown in FIG. 4.

If the call back option is chosen by the caller in step 520, the operation proceeds to step 522 where the subscriber/owner is called periodically. After step 522, the operation of the IICP proceeds to step 524 where call completion is determined. If the call is not completed as determined in step 524, the operation of the IICP proceeds to step 522 where a call back feature is periodically performed. If the call is completed as determined by step 524, the operation of the IICP proceeds to step 534 where a message is repeated that the caller of a certain ID called at time and then began the process of recalling the subscriber/owner. After step 534, the operation of the IICP proceeds to step 536 where the IICP determines if the call is completed. If the call is not completed, the operation proceeds to step 540 where the IICP determines if the owner cancels the return call function. If the owner does not cancel the return call function, operation of the IICP proceeds back up to step 534.

If the owner does cancel the return call function, operation proceeds directly from step 540 to step 546 where the monitor routine shown in FIG. 4 is performed. If the call is completed as determined by the IICP in step 536, the operation of the program proceeds to step 542 where the caller is connected to the owner's discrete line and the security number query is performed in step 544. Following step 544, the program moves to step 546 where the monitor program shown in FIG. 4 is performed.

If a fax is received, the operation of the program proceeds to step 550 in FIG. 13. Following step 550, the operation of the IICP proceeds to step 552 where the IICP receives a fax transmission and stores it in bit form. Following step 552, the IICP proceeds to step 554 which makes a note in the voice mail message center that a fax from a certain caller was received at the time and date and has not been read by the subscriber/owner. Following step 554, operation of the IICP proceeds to step 556 where there is a check on the owner/caller profiles for fax processing specifications.

Following step 556, the operation of the IICP proceeds to step 558 where it is determined whether there should be a re-broadcast of the fax. If not, operation proceeds to step 570. If a re-broadcast of the fax is determined to be necessary by the IICP in step 558, operation proceeds to step 560 where there is a transmission of faxes to fax numbers listed in the profile. Following step 560, the IICP transfers operation step 562 where there is a translation of the fax to voice mail and a copy of the local mail as well as a transmission to external mail. Following step 562, operation proceeds to 564 where there is a transmission of the fax to text and a transmission of the re-designation of the e-mail locations. Following step 564, operation proceeds to step 570.

In step 570, the IICP determines whether the subscriber/owner has been notified of the fax immediately. If not, the operation of the IICP proceeds to step 580 which calls the owner via the number list and a chase down function. After step 580, the IICP determines if the call is completed in step 582. If not, operation proceeds back up to step 580. If so, operation proceeds to step 584 which plays a message that a fax from a certain caller is received and is in voice mail. Following step 584, the IICP proceeds to step 586 which performs function code processing as shown in FIG. 17.

If the owner of the fax is not notified immediately as determined by the IICP in step 570, operation of the IICP proceeds to step 572 where the IICP determines whether to print out a copy of the fax locally. If the IICP determines that it should print out the fax locally, operation proceeds to step 574 where the print-out is made. If not, operation proceeds directly from step 572 to step 576. Following the operation of the print-out on the printer in step 574, operation proceeds to step 576 which includes the return to the monitor program shown in FIG. 4.

If modem data is received by the IICP, operation is transferred to step 600 as shown in FIG. 14. Following step 600, operation of the IICP proceeds to step 602 which receives the modem transmission and stores it in text form. Following step 602, operation of the IICP proceeds to step 604 which makes a note in the owner's voice mail that a subscriber received a modem transmission at a certain time and date and this modem transmission has yet to be read. Following step 604, operation proceeds to step 606 which checks the owner/caller profiles for the modem text in the processing specifications.

Following step 606, the IICP will determine whether to re-broadcast the text data in step 608. If not, the operation of the IICP will proceed from step 608 to step 616. If the re-broadcast of the text data is required as determined in step 608, operation of the IICP will proceed to step 610 which will transmit data as faxes to fax numbers listed in the profile. After step 610, operation of the IICP will proceed to step 612 which will translate the e-mail message to voice and copy that into local mail and transmit it to external mail. Following operation of step 612, operation proceeds to step 614 which will transmit the text group to designated e-mail locations. Following the operation of step 614, the IICP will proceed to step 616.

In step 616, the IICP will determine whether to notify the owner of text data immediately. If not, operation proceeds directly to step 618 where the IICP will determine whether to print out copy of the text data locally. If the IICP determines not to print out the text data locally, operation proceeds to step 622 where the IICP will begin the monitor program as shown in FIG. 4. If the print out of text data is determined to be necessary by the IICP in step 618, operation proceeds to step 620 where the text is printed out on a local printer. Following this print out, operation of the IICP proceeds from step 620 to step 622.

If the IICP determines in step 616 to notify the subscriber/owner of text data immediately, operation proceeds to step 624 where the IICP will call immediately the subscriber/owner via a number list held in the database. Essentially, step 624 will chase down the owner via this number list. Following step 624, operation proceeds to step 626 where the IICP determines if the call has been completed. If not, operation proceeds back up to step 624. Once the call has been completed in step 626, operation proceeds to step 628 where a message is played for the subscriber/owner that data from a certain caller is in voice mail. Following the operation of step 628, operation proceeds to step 630 where the function code processing occurs as shown in FIG. 17.

Figure 15:
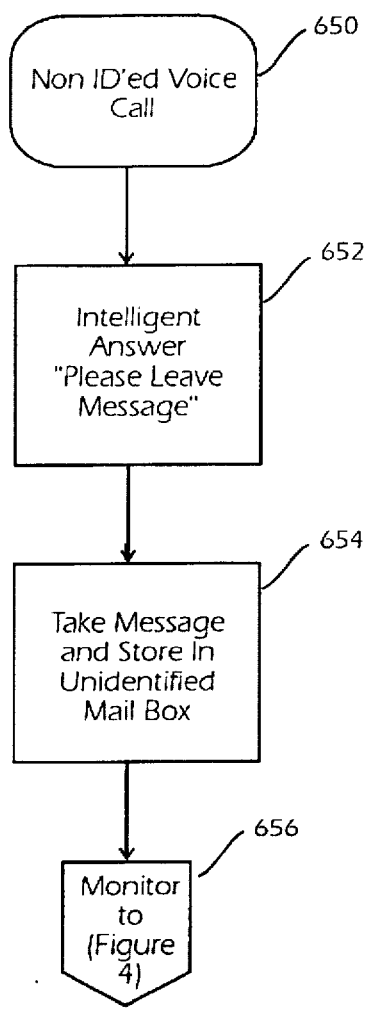

When non-ID code voice callers are received, operation of the IICP proceeds to step 650 as shown in FIG. 15. Following step 650, operation of the IICP proceeds to step 652 where an intelligent answer is performed by the IICP such as "please leave a message". Following the intelligent answer in step 652, the IICP operation proceeds to step 654 where the message is taken and stored in a mailbox. Following step 654, operation proceeds to step 656 which initiates the monitor program for the IICP as shown in FIG. 4.

Figure 16:
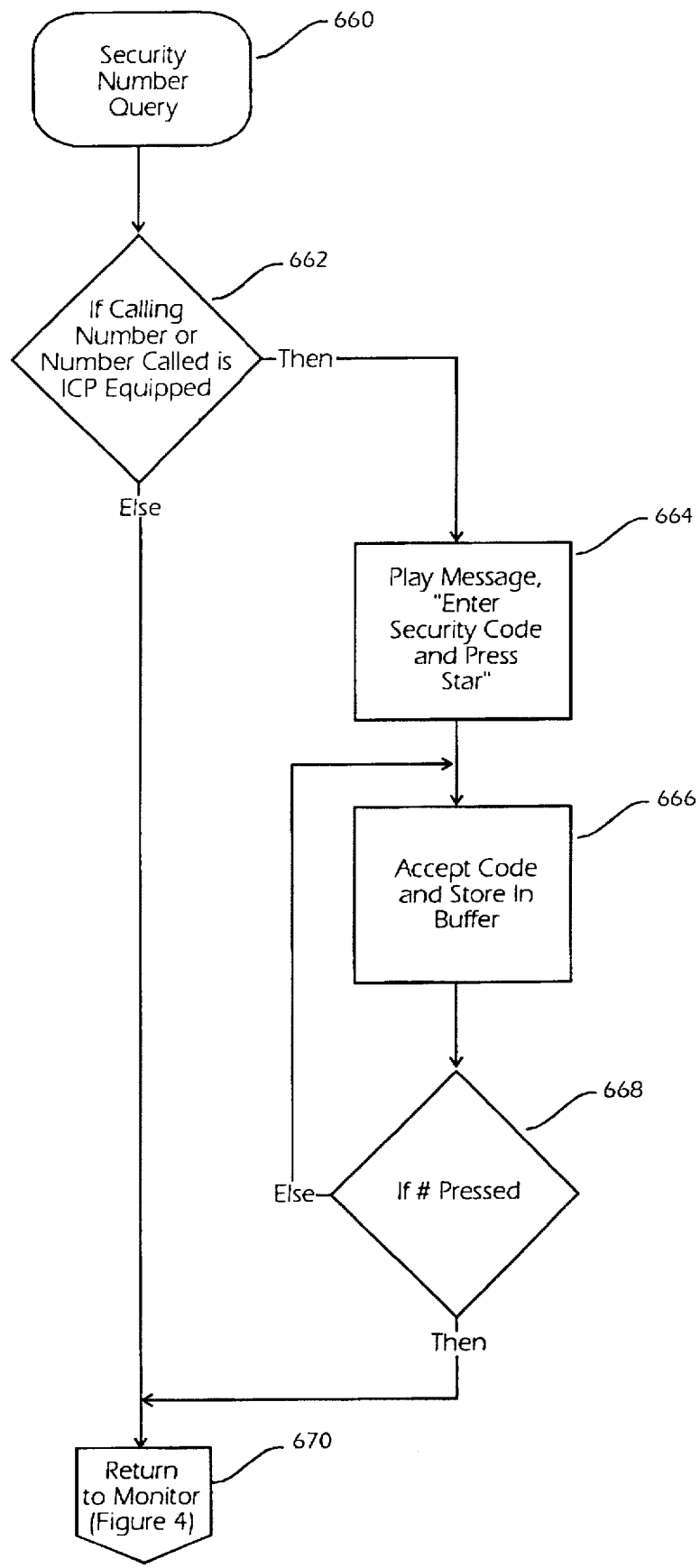

The security number query routine is shown in FIG. 16 and begins at step 660. Following step 660, operation proceeds to step 662 where an IICP is determined to be the calling number or a called number. If so, the operation proceeds to step 664 where a message is played to enter the security code and press the * button. Following step 664, operation proceeds to step 666 where the code is accepted and stored in a buffer. Following step 666, operation of the IICP proceeds to step 668 where it is determined if a number has been pressed. If not, operation of the IICP proceeds back up to step 666 where the operation of accepting and storing a code is performed. If no number is entered as determined by the IICP in step 668, operation proceeds to step 670. Further, if neither the calling number nor the called number is IICP equipment as determined in step 662, the operation of the IICP will proceed directly from step 662 to step 670 where the IICP will return to the monitor program shown in FIG. 4.

When a function code has been entered into the IICP, function code processing begins at step 680 as shown in FIG. 17. Following step 680, the operation of the IICP proceeds to step 682 where there is a comparison of the input DTMF signal with valid function codes. Following step 682, operation of the IICP proceeds to step 684 where there is a comparison of the input DTMF signal with valid function codes. If there is a hang up as determined in step 684, operation proceeds to step 670 where there is a return to the monitor program shown in FIG. 4. If there is a valid function code as determined in step 684, the IICP operation will proceed to step 686 where the IICP will perform the function for the user. If there is an invalid signal input into the IICP as determined in step 684, operation proceeds from step 684 to step 680.

Figure 18:
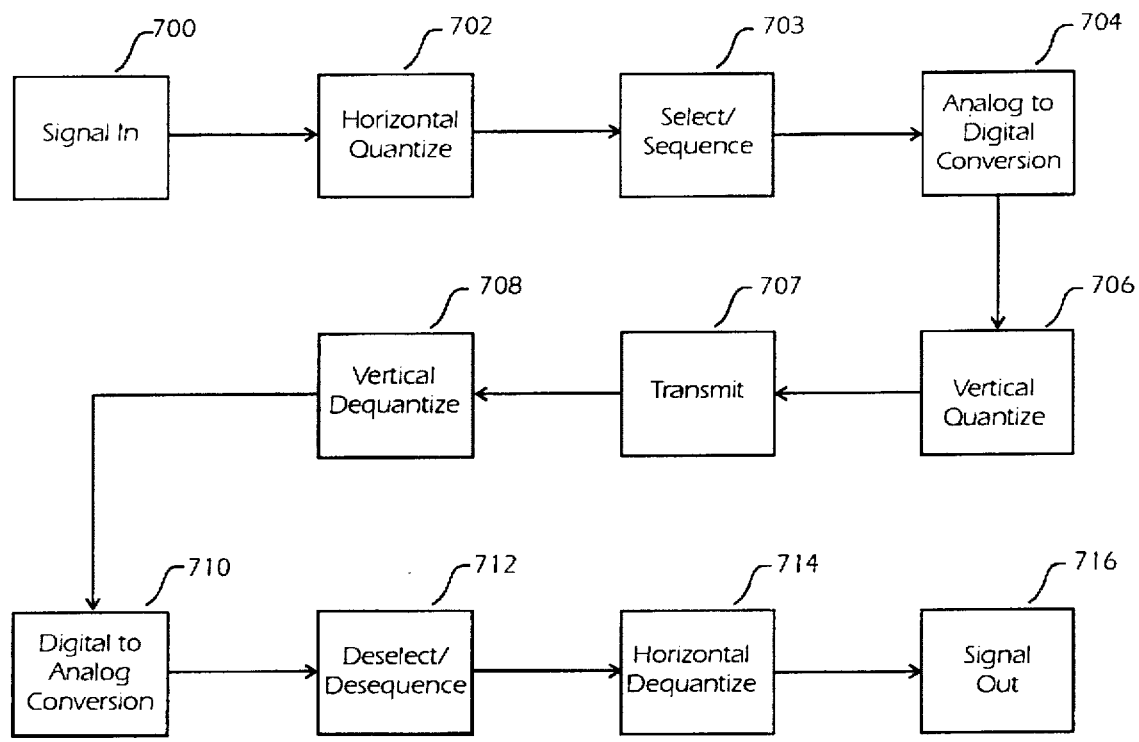
FIG. 18 is a flow chart disclosing the encryption/decryption scheme used in the invention.

The security encryption and de-encryption operation is shown in FIG. 18. Beginning with step 700, the signal input into the IICP is horizontally quantized in step 702. From this horizontal quantized signal, each horizontal component is selected in sequence along the transmission line in step 703. Following step 703, operation proceeds to step 704 where the individual horizontal quantized and selected signal is converted to a digital signal. This digital signal is then quantized in a vertical manner in step 706. Following the vertical quantization of this data, the transmission is made from one subscriber to another subscriber in step 707. After receipt by the second subscriber, there is a vertical de-quantization performed in step 708.

Following step 708, there is a digital-to-analog conversion in step 710, followed by deselection or desequencing of the vertical dequantized and analog information in step 712. Following step 712, operation proceeds to step 714 where there is a horizontal dequantization of the desequenced signal. Following step 714, the signal is output to the user. This encryption/decryption is very difficult to break and would require a massively parallel processing in order to decipher.

While the preferred embodiment has been described herein, it is recognized that various modifications may be made to the invention without departing from the invention.

We claim:

1. A multiple function intelligent communication platform at a subscriber location comprising:
   a real-time processor coupled to a memory storage unit and a DTMF signal encoder/decoder wherein said processor is a multi-function processor which runs an operational computer program supporting the functionality of a multiple function intelligent communication platform;
   a multiple channel data controller coupled to said real-time processor and a plurality of input/output ports;
   input/output ports coupled to a signal switching controller having a touch-tone keypad station set and a cellular telephone line connection; and,
   a database memory and solid state memory storage accessible to said real-time processor.

2. The multiple function intelligent communication platform of claim 1 further comprising:
   conversion units coupled to the real-time processor that converts data from one format to another format.

3. The multiple function intelligent communication platform of claim 1 further comprising:
   an audio input/output port coupled to an audio mixer unit which is coupled to said real-time processor.

4. The multiple function intelligent communication platform of claim 1 further comprising:
   a video input/output port coupled to a video mixer unit which is coupled to said real-time processor.

5. The multiple function intelligent communication platform of claim 1 further comprising:
   an encryption/decryption unit coupled to said real-time processor that encrypts or decrypts data.

6. A multiple function intelligent communication platform at a subscriber location comprising:
   a real-time processor coupled to a memory storage unit and that runs an operational computer program;
   a multiple channel data controller coupled to said real-time processor and a plurality of input/output ports;
   input/output ports coupled to a signal switching controller having a touch-tone keypad station set and a cellular telephone line connection;
   a database memory and solid state memory storage accessible to said real-time processor;
   an audio input/output port coupled to an audio mixer unit which is coupled to said real-time processor; and,
   a video input/output port coupled to a video mixer unit which is coupled to said real-time processor.

7. The multiple function intelligent communication platform of claim 6 further comprising:
   a plurality of conversion units coupled to the real-time processor that converts data from one format to another format.

8. The multiple function intelligent communication platform of claim 7 further comprising:
   an encryption/decryption unit coupled to said real-time processor that encrypts and decrypts data.

9. A method of controlling a multiple function intelligent communication platform comprising the steps of:
   initializing a real-time processor which runs a control program and resetting all data variables to a default value;
   processing timed control events including a reminder subroutine based upon calendar entries;
   monitoring line failures and power failures including emergency notification capabilities if failures not corrected within a predetermined time period;
   processing outgoing call communications including connecting to an outside line; and,
   processing incoming call communications including supporting full capabilities of voice, facsimile and modem data transmissions;
   recording call information in memory on the platform after call completion.

10. The method of controlling a multiple function intelligent communication platform in claim 9 further comprising the steps of:
    supporting video interface communications in the timed control event processing step.

11. The method of controlling a multiple function intelligent communication platform in claim 9 further comprising the steps of:
    supporting remote sensor communications in the timed control event processing step.

12. The method of controlling a multiple function intelligent communication platform in claim 9 further comprising the steps of:
    supporting a non-interference routine and an emergency interrupt routine in the outgoing call processing step.

13. The method of controlling a multiple function intelligent communication platform in claim 9 further comprising the steps of:
    supporting a repeat outgoing call routine in the outgoing call processing step.

14. The method of controlling a multiple function intelligent communication platform in claim 9 further comprising the steps of:
    possessing a multiple outgoing call capacity routine for conference calls in the outgoing call processing step.

15. The method of controlling a multiple function intelligent communication platform in claim 9 further comprising the steps of:
    possessing a database check routine to check the dialed number against a database of numbers and a security number input routine in the outgoing call processing step.

16. The method of controlling a multiple function intelligent communication platform in claim 9 further comprising the steps of:
    possessing a fully automated answering machine routine in the incoming call processing step.

17. The method of controlling a multiple function intelligent communication platform in claim 9 further comprising the steps of:
    possessing a locate routine capable of placing the incoming caller on hold and broadcasting calls to predetermined subscriber locations in search of the called party in the incoming call processing step.

18. The method of controlling a multiple function intelligent communication platform in claim 9 further comprising the steps of:
    possessing a fully automated call back routine for auto-redialing and a call forward routine in the incoming call processing step.

19. The method of controlling a multiple function intelligent communication platform in claim 9 further comprising the steps of:
    possessing a security number input routine and a call screening routine in the incoming call processing step.

20. The method of controlling a multiple function intelligent communication platform in claim 9 further comprising the steps of:
    possessing a cellular radio loop on the incoming call processing and outgoing call processing steps.

* * * * *